(12) United States Patent
Mochizuki et al.

(10) Patent No.: US 6,729,760 B2
(45) Date of Patent: May 4, 2004

(54) MOTION GUIDE DEVICE

(75) Inventors: Hiroaki Mochizuki, Yamanashi-ken (JP); Hiroshi Takamatsu, Yamanashi-ken (JP)

(73) Assignee: THK Co., Ltd., Tokyo (JP)

( * ) Notice: Subject to any disclaimer, the term of this patent is extended or adjusted under 35 U.S.C. 154(b) by 35 days.

(21) Appl. No.: 09/926,759

(22) PCT Filed: May 25, 2001

(86) PCT No.: PCT/JP01/04403

§ 371 (c)(1),
(2), (4) Date: Dec. 13, 2001

(87) PCT Pub. No.: WO01/92738

PCT Pub. Date: Dec. 6, 2001

(65) Prior Publication Data

US 2002/0136472 A1 Sep. 26, 2002

(30) Foreign Application Priority Data

| May 29, 2000 | (JP) | ........................................ | 2000-157728 |
| May 23, 2001 | (JP) | ........................................ | 2001-153444 |

(51) Int. Cl.⁷ ............................................. F16C 29/06
(52) U.S. Cl. ........................................... 384/45; 384/55
(58) Field of Search ............................ 384/43, 44, 45, 384/55

(56) References Cited

U.S. PATENT DOCUMENTS

| 4,576,420 A | * | 3/1986 | Lehmann et al. ............. 384/45 |
| 4,674,893 A | * | 6/1987 | Teramachi .................... 384/45 |
| 4,974,971 A | * | 12/1990 | Tanaka ........................ 384/45 |
| 5,193,914 A | * | 3/1993 | Tanaka ........................ 384/45 |
| 6,132,093 A | * | 10/2000 | Michioka et al. ............. 384/45 |
| 6,203,199 B1 | * | 3/2001 | Pfeuffer ....................... 384/45 |

FOREIGN PATENT DOCUMENTS

| JP | 60-139912 | 7/1985 |
| JP | 1-175564 | 7/1989 |
| JP | 4-194413 | 7/1992 |
| JP | 4-351316 | 12/1992 |
| JP | 9-72335 | 3/1997 |
| JP | 11-72119 | 3/1999 |

* cited by examiner

*Primary Examiner*—William C. Joyce
(74) *Attorney, Agent, or Firm*—Westerman, Hattori, Daniels & Adrian, LLP

(57) ABSTRACT

A linear motion guide device having a motion guide device capable of preventing thin and long-scaled support member and escape passage constituting member from being flexed and preventing an inner periphery guide section constituting member from being opened. Provided are Support members for preventing rolling members from coming off from loaded rolling member rolling passages when a movable block is removed from a track rail. Escape passage constituting members are provided constituting escape passages and the inner periphery guide section constituting members are provided constituting inner periphery guide section for direction changing of the rolling members are formed of resin so as to be respectively independent from the block body and from each other.

8 Claims, 22 Drawing Sheets

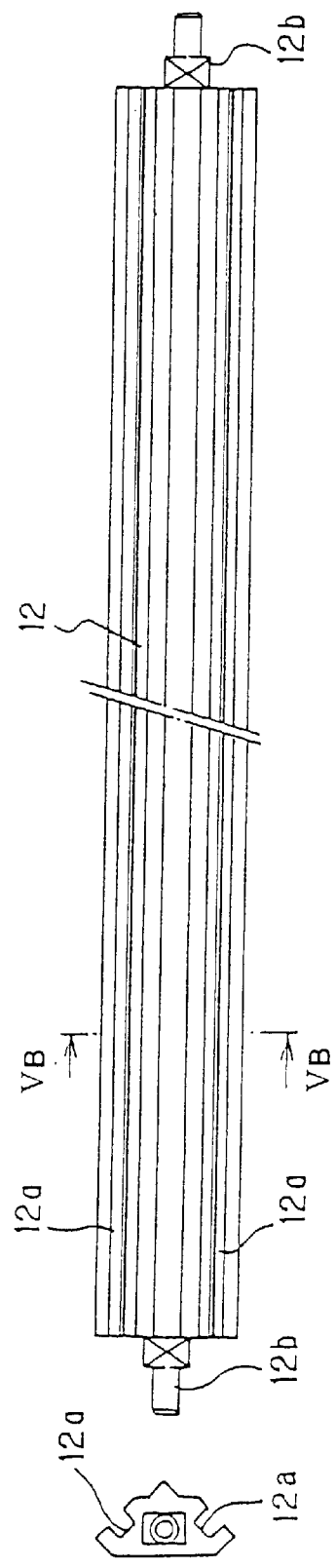

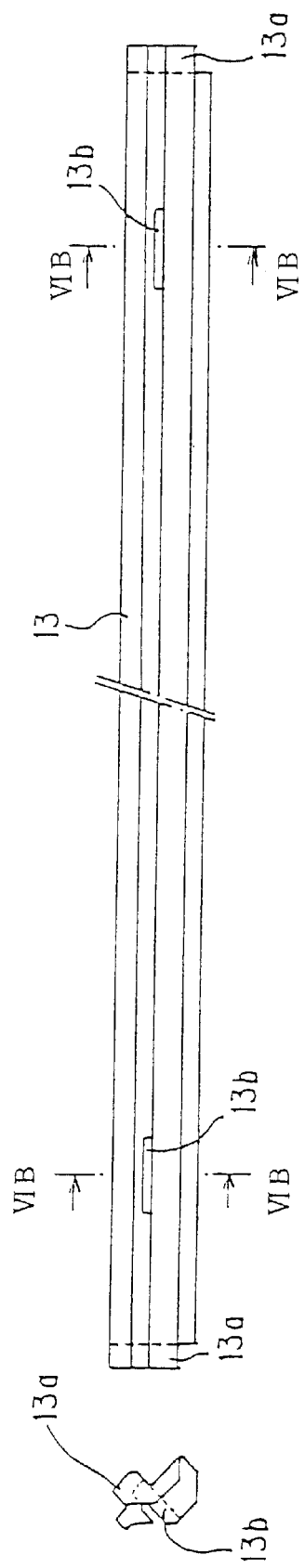

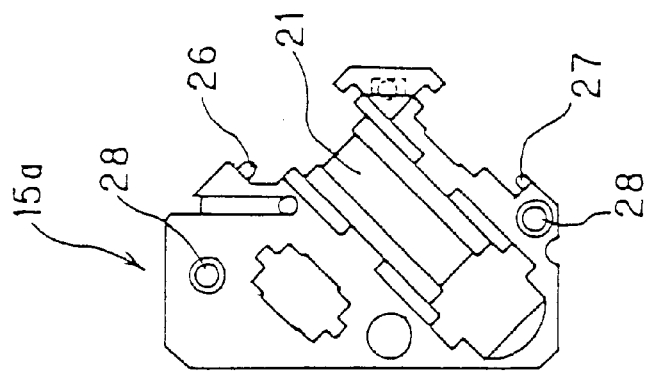
FIG. 7A    FIG. 7B    FIG. 7C
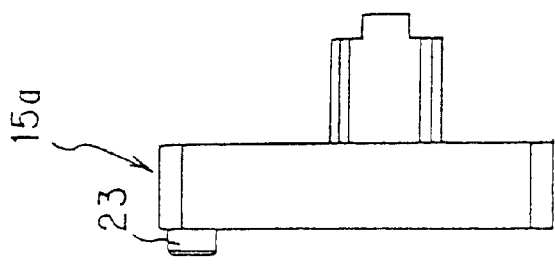
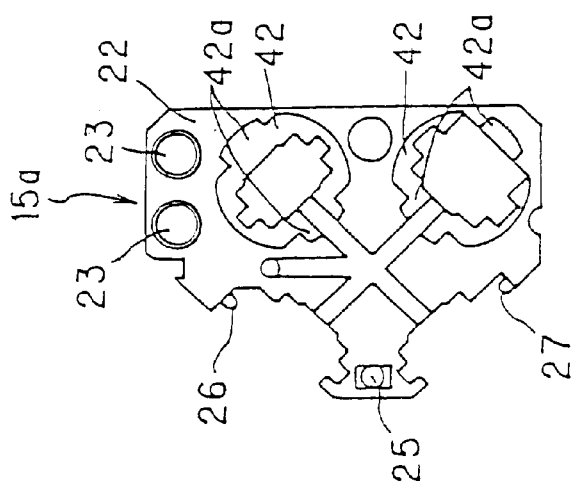

FIG. 18A
FIG. 18B
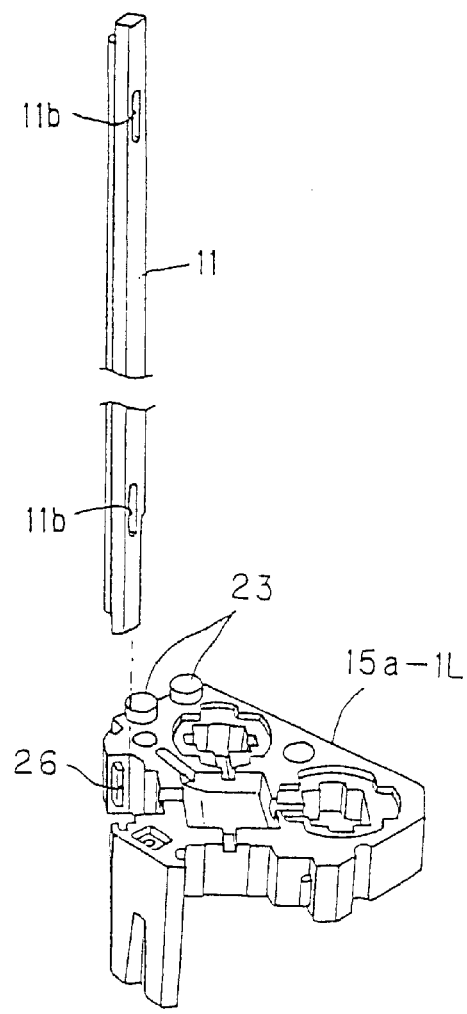
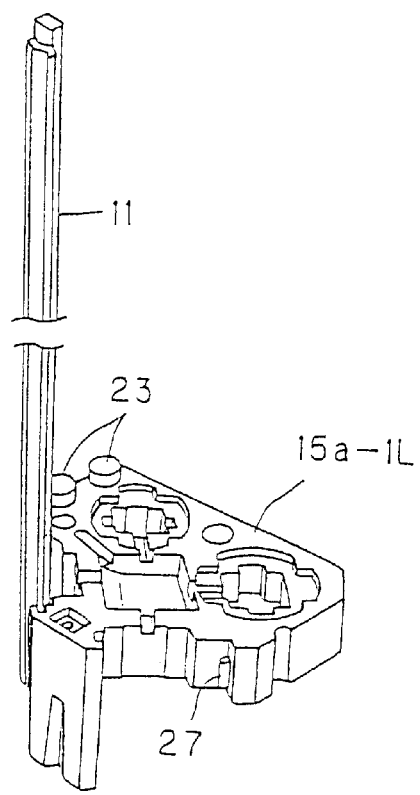

MOTION GUIDE DEVICE

FIELD OF THE INVENTION

The present invention relates to a motion guide device provided with a movable member having a body into which passage constituting members formed of resin material are assembled.

BACKGROUND ART

A motion guide device is provided with a track rail on which a rolling member rolling portion is formed and a movable block disposed to be movable along the track rail through a number of rolling members such as bolls or rollers. The movable block is formed with a loaded rolling member rolling portion corresponding to a rolling member rolling portion of the track rail, a rolling member escape passage formed in parallel to the loaded rolling member rolling portion with a predetermined space therefrom, and a pair of rolling member rolling direction changing passages each of which connects the loaded rolling member rolling portion and the rolling member escape passage to each other to thereby constitutes a rolling member circulation passage along which the rolling members circulate.

The applicant of the subject application has proposed a technology, such as Japanese Patent Laid-open Publication No. HEI 7-317762, in which support members (retainers) extending along both side edges of the rolling member rolling groove in a loaded area of the movable block, an escape passage constituting member constituting the escape passage of the rolling member, and inner periphery guide section constituting member constituting an inner periphery guide section of the rolling direction changing passage are integrally formed with a body of the movable block through a resin molding process.

However, in such movable block with which the resin portions or members are integrally formed, when the movable block body has a large size or scale, it is necessary to prepare a large-sized mold, which makes it difficult to manufacture such mold. Furthermore, the support members extending along both the side edges of the rolling member rolling groove have thin thickness and long length. Therefore, there may cause a case that resin may not sufficiently be supplied at the time of the molding, thus being also inconvenient.

In order to solve such problems or inconveniences mentioned above, the applicant of the subject application has also provided a motion guide device in which the support members, the escape passage constituting member and the inner periphery guide section constituting member, which are all formed of resin, were formed as separate units independent from the movable block body and then assembled with the movable block body to thereby make easy the molding process and constitute the movable block.

In such motion guide device, connecting portions of the support members, the escape passage constituting members and the inner periphery guide section constituting members are formed to be continuous so as to make smooth the circulation of the rolling members. That is, at least one of connecting portions of these members is integrally formed.

However, even in such structure, these support members, the escape passage constituting members and the inner periphery guide section constituting members have shapes different from each other and amounts (volumes) of resin shrinkage cavities thereof are also different from each other.

Accordingly, in the case where the connecting portions of the support members, the escape passage constituting members and the inner periphery guide section constituting members are integrally formed, the thin and long support members and escape passage constituting members may be flexed and the inner periphery guide section constituting members may be opened, which constitutes a further problem. That is, since the rolling members circulate at high speed in the circulation passage constituted by such support members, escape passage constituting members and inner periphery guide section constituting members, such flexible structure of the support members and the escape passage constituting members and the opening (widening) of the inner periphery guide section constituting members will disturb the smooth circulation of the rolling members in the circulation passage.

DISCLOSURE OF THE INVENTION

The present invention has been conceived in consideration of the above matters, and an object of the present invention is to provide a motion guide device which can be easily manufactured even having a large scale and, moreover, in which the long and thin support members and escape passage constituting members are not flexed and the inner periphery guide section constituting members are not opened (widened).

Hereunder, the present invention will be described. Further, it is to be noted that although reference numerals used in the accompanying drawings are added to respective members or portions by applying ( ) for the sake of easy understanding of the present invention, the present invention is not limited to the embodiments shown in the drawings.

The above object can be achieved according to the present invention by providing a motion guide device which comprises a track member (1) provided with rolling member rolling portions (1b, 1b) and a movable member (2) disposed to be movable along the track member (1) through a number of rolling members (3 - - - ) and in which the movable member (2) is provided with loaded rolling member rolling portions (4d, 4d) corresponding to the rolling member rolling portions (1b, 1b) of the track member (1), rolling member escape passages disposed in parallel to the loaded rolling member rolling portions (4d, 4d) with a predetermined distance and a pair of direction changing passages connecting the loaded rolling member rolling portions (4d, 4d) and the rolling member escape passages to thereby circulate the rolling members, wherein support members (11, 12, 13) extending along both side edges of the loaded rolling member rolling portions (4d, 4d), escape passage constituting members (14, 14) constituting the rolling member escape passages and a pair of inner periphery guide section constituting members (15a, 15a) constituting the inner peripheral portions of the direction changing passages are formed to be independent from a body (4) of the movable member and also independent from each other and are assembled to the body (4) of the movable member.

According to this invention, since the support members, the escape passage constituting members and the inner periphery guide section constituting members are formed independently from the body of the movable member and from each other, these members can be manufactured by preliminarily calculating amounts of respective shrinkage cavities of the support members, the escape passage constituting members and the inner periphery guide section constituting members. As a result, the long and thin support members and escape passage constituting members can be prevented from being flexed, and the inner periphery guide section constituting members can be also prevented from being opened.

In one preferred embodiment of this invention, the support members act to prevent the rolling members (3 - - - ) from coming off from the loaded rolling member rolling portions (4d, 4d) at a time when the movable member (2) is removed from the track member (1).

In another preferred embodiment of this invention, either one of the inner periphery guide section constituting members (15a, 15a) and the body (4) of the movable member is formed with a positioning recess (24) for positioning the inner periphery guide section constituting members (15a, 15a) with respect to the body (4) of the movable member and the other one thereof is formed with a movable member body positioning protrusion (23) to be engaged with the movable member body positioning recess (24); either one of the inner periphery guide section constituting members (15a, 15a) and the escape passage constituting members (14, 14) is formed with a positioning recess (42) for positioning the escape passage constituting members with respect to the inner periphery guide section constituting members (15a, 15a) and the other one thereof is formed with an escape passage constituting member positioning protrusion (20) to be engaged with the escape passage constituting member positioning recess (42); and either one of the inner periphery guide section constituting members (15a, 15a) and the support members (11, 12, 13) are formed with positioning recesses (11b, 13b, 25) for positioning the support members (11, 12, 13) with respect to the inner periphery guide section constituting members (15a, 15a) and the other one thereof is formed with support member positioning protrusions (26, 27, 12b) to be engaged with the support member positioning recesses (11b, 13b, 25).

According to the above embodiment, in the case where the support member, the escape passage constituting member and the inner periphery guide section constituting member are manufactured independently from the body of the movable member and also independently from each other, the number of constitutional members or parts increases and, hence, the assembling working may be made difficult. According to the present invention, however, since the support member and the escape passage constituting member are positioned with reference to the inner periphery guide section constituting member which is positioned to the body of the movable member, the working precision or performance of the support member, escape passage constituting member and inner periphery guide section constituting member can be improved. As a result, even in the case where the support member, the escape passage constituting member and the inner periphery guide section constituting member are manufactured independently from the body of the movable member and also independently from each other, these circulation passage constituting members never make worse the motion of the rolling members. Moreover, since the support member and the escape passage constituting member are positioned and assembled with the inner periphery guide section constituting member being one reference member, the support member, the escape passage constituting member and the inner periphery guide section constituting member can be easily assembled with high reproductivity.

Furthermore, in a further preferred embodiment of the present invention, a pair of side lids (5, 5) constituting outer periphery guide sections of the direction changing passages are mounted to both longitudinal end portions of the movable member body (4), both the end portions of the support member (11, 13) are inserted into the side lids (5, 5), and either one of the inner periphery guide section constituting members (15a, 15a) and the support members (11, 13) is formed with a positioning recess (11b, 13b) for positioning the support members with respect to the inner periphery guide section constituting members (15a, 15a) and the other one thereof is formed with support member positioning protrusions (26, 27) to be engaged with the support member positioning recesses (11b, 13b).

According to this invention, since both the end portions of the support members are inserted into the paired side lids mounted to the body of the movable member, the support member can be firmly fixed thereto. Moreover, in the case where both the end portion of the support member are fitted into the side lids, when it is required to carry out the assembling working, it is necessary that the support member is once inserted into one of the side lids, the rolling members are fitted and, then, the other side lid is inserted into the other end portion of the support member. In the process that the other side lid is inserted, there is a fear that the support member falls down and, hence, the side lids may not be precisely fitted to the support member. According to this invention, however, the support member can be positioned by the inner periphery guide section and the side lids, so that the support member is supported at two portions, and accordingly, the fear of falling-down of the support member in the assembling process will be reduced. Thus, the side lids can be simultaneously inserted into a plurality of support members, enabling the assembling process to be easy.

Furthermore, in a preferred embodiment of this invention, a number of rolling members (3, 3, - - - ) are held in series with predetermined distance by a rolling member support belt (10) having side edge portions (10d) projecting over both side end portions of the rolling members, and by assembling the support members (11, 12, 13) to the body (4) of the movable member, a guide section (43) for guiding the side edge portions (10d) of the rolling member support belt (10) is formed.

According to this invention, the rolling member support belt is held by the support member and the guide section formed by the body of the movable member, thus being prevented from coming off from the movable member. On the other hand, the rolling members can be held by the rolling member support belt, and accordingly, the rolling member support belt and the rolling members never come off from the movable member.

In a further preferred embodiment of the present invention, the track member is a track rail (1) and the movable member is a movable block (2) provided with a pair of sleeve portions disposed so as to oppose to both side surfaces of the track rail, the rolling member rolling portions are vertical two rows of rolling member rolling passages (1b, 1b) formed on each of lateral side surfaces of the track rail (1), totally, four rows thereof, the loaded rolling member rolling portions are vertical two rows of loaded rolling member rolling passages (4d, 4d) formed on each of inner side surfaces of the lateral sleeve portions (2b, 2b) of the movable block (2), totally, four rows thereof, the escape passage constituting passage includes vertical two rows thereof formed on each of the lateral sleeve portions (2b, 2b) of the movable block, totally, four rows thereof, the direction changing passages connect an upper loaded rolling member rolling passage and a lower rolling member escape passage (14, 14) and connect an lower loaded rolling member rolling passage and an upper rolling member escape passage so as to constitute grade separation structure, and the inner periphery guide section constituting member is composed of a pair of divided blocks (15a, 15b) divided in the longitudinal direction of the track rail (1).

According to this invention, the inner periphery guide sections to which the direction changing passages in grade separation can be easily manufactured.

In a still further preferred embodiment of this invention, either one of the paired divided blocks (15a, 15b) is formed with a positioning recess (28) for positioning the paired divided blocks and the other one thereof is formed with a divided block positioning protrusion (33) to be engaged with the divided block positioning recess (28).

According to this invention, even in the case of the divided inner periphery guide section, the inner periphery guide section can be assembled with high precision.

In a still further preferred embodiment of the present invention, the support members (11, 12, 13) include a first support member (11) disposed above the upper loaded rolling member rolling passage (4d), a second support member (12) disposed between the upper loaded rolling member rolling passage (4d) and the lower rolling member rolling passage (4d) and a third support member (13) disposed below the lower loaded rolling member rolling passage (4d).

According to this invention, the second support member is commonly utilized with the upper loaded rolling member rolling passage and the lower rolling member rolling passage, so that the number of the parts or members to be used can be reduced in comparison with the case where the second support members are disposed respectively to the upper loaded rolling member rolling passage and the lower rolling member rolling passage.

Still furthermore, the object of the present invention mentioned above can be also achieved by a motion guide device which comprises a track member (1) provided with rolling member rolling portions (1b, 1b) and a movable member (2) disposed to be movable along the track member (1) through a number of rolling members (3, 3, - - -) and in which the movable member (2) is provided with loaded rolling member rolling portions (4d, 4d) corresponding to the rolling member rolling portions (1b, 1b) of the track member (1), rolling member escape passages disposed in parallel to the loaded rolling member rolling portions (4d, 4d) with a predetermined distance and a pair of direction changing passages connecting the loaded rolling member rolling portions (4d, 4d) and the rolling member escape passages to thereby circulate the rolling members, wherein support members (11, 12, 13) extending along both side edges of the loaded rolling member rolling portions (4d, 4d) and a pair of inner periphery guide section constituting members (15a, 15b) constituting the inner peripheral portions of the direction changing passages are formed to be independent from a body (4) of the movable member and also independent from each other and are assembled to the body (4) of the movable member, and the rolling member escape passages are constituted by through holes perforated to the body (4) of the movable member.

According to this invention, since the support members and the inner periphery guide section constituting members are formed independently from the body of the movable member and from each other, these members can be manufactured by preliminarily calculating respective shrinkage cavities of the support members and the inner periphery guide section constituting members. As a result, the long and thin support members can be prevented from being flexed and the inner periphery guide section constituting members can be also prevented from being opened.

BRIEF DESCRIPTION OF THE DRAWINGS

In the accompanying drawings:

FIG. 5A is an illustrated side view of a second support member and FIG. 5B is a sectional view taken along the line VB—VB in FIG. 5A;

FIG. 6A is an illustrated side view of a third support member and FIG. 6B is a sectional view taken along the line VIB—VIB in FIG. 6A;

FIG. 7 shows an inner side inner periphery guide section constituting member and includes FIG. 7A being a front view thereof, FIG. 7B being a side view thereof and FIG. 7C being a back side view thereof;

FIG. 18 is a perspective view showing a detail of mounting the first support member to the inner periphery guide section constituting member (inner divided block), in which FIG. 18A represents a state before the mounting thereof and FIG. 18B represents a state after the mounting thereof;

FIG. 20 shows a detail of a process of inserting the first and third support members into the side lid, in which

BEST MODE FOR EMBODYING THE INVENTION

Figure 1:
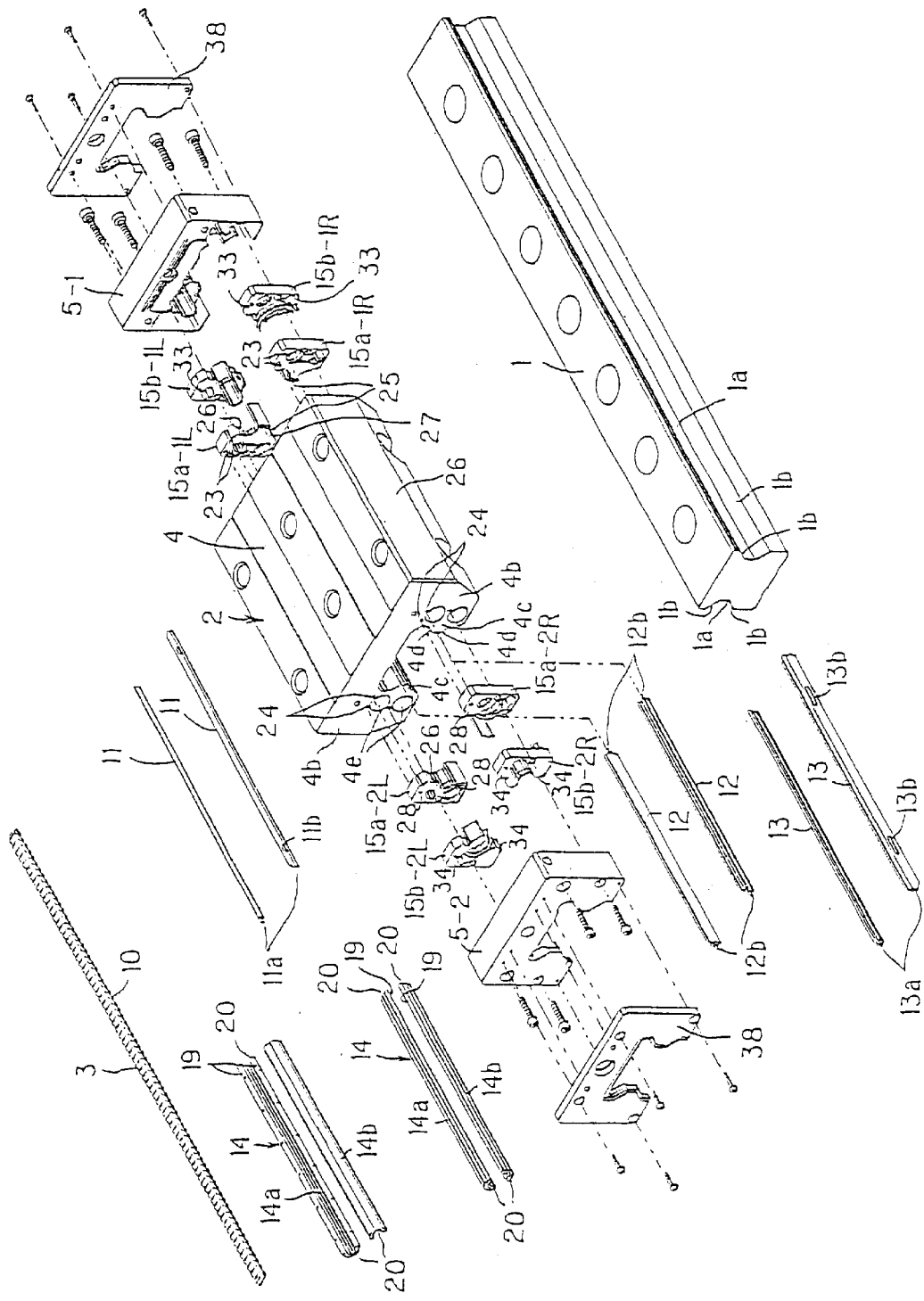
FIG. 1 is a developed perspective view of a linear motion guide device according to a first embodiment of the present invention.
Figure 2:
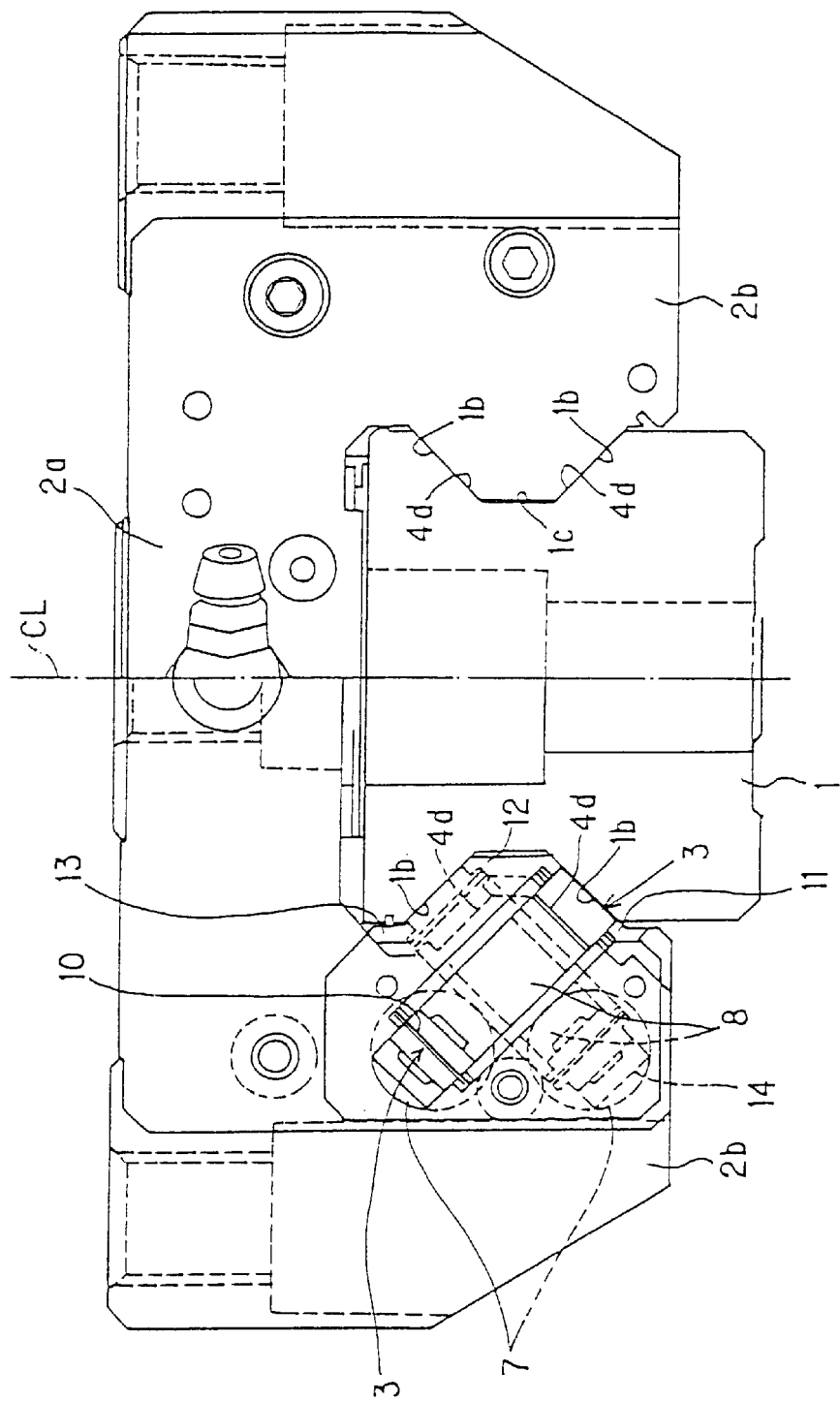
FIG. 2 is a side (end) view, partially including a cross sectional area, of the linear motion guide device of FIG. 1.

FIGS. 1 and 2 represent a linear motion guide device according to a first embodiment of a motion guide device of the present invention, and the linear motion guide device comprises a track rail 1 as a linearly extending track member and a movable block as a movable member assembled with the track rail 1 to be movable through a number of balls 3 as rolling members.

The track rail 1 has a longitudinally extending structure having approximately rectangular cross section, and the track rail 1 has both lateral side surfaces on which grooves 1a are respectively formed. The groove 1a has side wall sections 1b, 1b and bottom wall section 1c.

As shown in FIG. 2, the extensions of the side wall sections 1b, 1b of the groove 1a intersect each other at a right angle of 90° degrees, and in the illustration, upper and lower side wall sections 1b, 1b constitute roller rolling surfaces along which the rollers roll. That is, both the side surfaces of the track rail 1 are formed with two upper and lower roller rolling surfaces 1b, 1b as, totally, four rolling member rolling surfaces.

On the other hand, the movable block 2 is provided with a flat (horizontal) section 2a corresponding to the upper surface of the track rail 1 when assembled and a lateral pair of sleeve (skirt) sections 2b, 2b extending downward from both side ends of the flat section 2a so as to oppose to the side surfaces of the track rail 1. The movable block 2 is composed of a block body 4 made of steel, a circulation passage forming structure made of resin (circulation passage structure, hereinlater) which is assembled with the block body 4 and a pair of side lids 5, 5 with which the circulation passage structure is assembled. The side lids 5, 5 may be called as end plates 5, 5 which are mounted to both the longitudinal end portions of the block body 4.

The sleeve sections 4b, 4b of the block body 4 are formed with projections 4c, 4c each having an outer shape substantially in conformity with the shape of the groove 1a formed on each side surface of the track rail. The projections 4c are formed with two loaded roller rolling surfaces 4d, 4d, as loaded rolling member rolling surfaces, corresponding to the roller rolling surfaces 1b, 1b of the track rail 1. That is, upper and lower (two) loaded roller rolling surfaces 4d, 4d are formed on each of the lateral sleeve sections 4b, 4b of the block body 4. (Totally, four surfaces 4d, 4d are formed).

Figure 3:
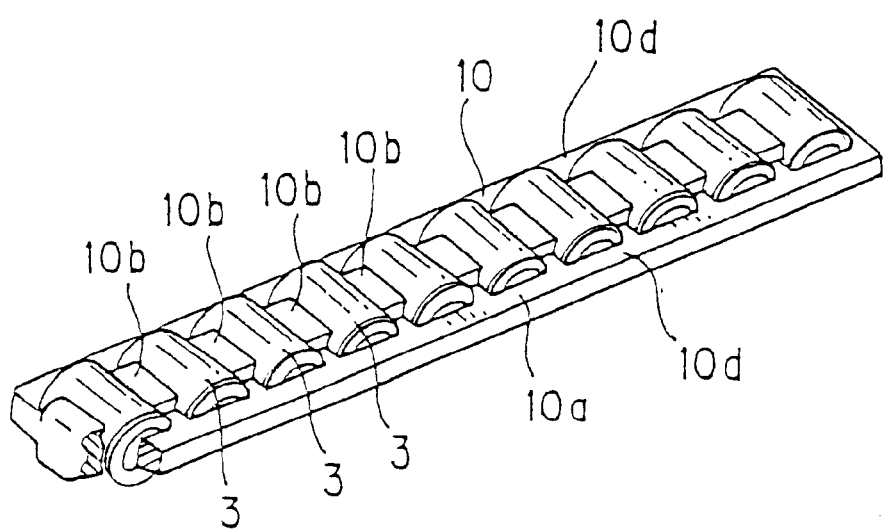
FIG. 3 shows an arrangement of rollers held by and accommodated in a roller support (holding) belt.

Furthermore, each of the sleeve sections 2b, 2b of the movable block 4 is formed with upper and lower (two) roller escape passages 7, 7 in parallel to the upper and lower loaded roller rolling surfaces 4d, 4d, respectively with a predetermined space and U-pipe-shaped direction changing passages 8, 8 connecting both end portions of the loaded roller rolling surfaces 4d, 4d and the roller escape passages 7, 7, respectively, so as to circulate the rollers 3, 3, - - - , 3, as shown in FIG. 3. That is, these loaded roller rolling surfaces 4d, 4d, the paired rolling direction changing passages 8, 8 and the roller escape passages 7, 7 constitute a roller circulation passage.

The four, each two, rows of the upper and lower roller escape passages 7, 7 are formed on each of the lateral sleeve sections 2b, 2b, and the rolling direction changing passages 8, 8 are formed so as to connect the upper loaded roller rolling surface 4b and the lower roller escape passage 7 and connect the lower loaded roller rolling surface 4b and the upper roller escape passage 7 in the illustrated state, in which the flat section 2a of the movable member 2 is disposed upward, to thereby establish a grade separation arrangement.

Four, respectively two, roller circulation passages are formed on the lateral sleeve sections 2b, 2b of the block body 4, and each of the roller circulation passages is formed in one plane so that the rollers 3, 3, - - - , 3 circulate two-dimensionally along the roller circulation passages. A plane in which one of the roller circulation passages is positioned and another plane in which the other one of the roller circulation passages is arranged are crossed each other at the right angle, so that one of the roller circulation passages is positioned on the inner peripheral side of the other one.

With reference to FIG. 3, the rollers 3, 3, - - - , 3 are arranged in series through a roller support (holding) belt 10, as rolling member support belt, and the rollers 3, 3, - - - , 3 circulate in the state held (retained) by the roller support belt 10. The roller support belt 10 is composed of a flexible belt member 10a formed with roller holes into which the rollers are accommodated and held, respectively, and spacers 10b, 10b each disposed between the rollers in the roller holes. The flexible belt member 10a has side edge portions 10d, 10d positioned outside the axial ends of the rollers 3, 3, - - - , 3.

The resin circulation passage structure comprises: support members 11, 12 and 13 extending along both side edges of the loaded roller rolling surfaces 4d, 4d and preventing the rollers, 3, 3, - - - , 3 from coming off from the loaded roller rolling surfaces 4d, 4d at a time when the movable block 2 is removed from the track rail 1; escape passage constituting members 14, 14 constituting the roller escape passages; and a pair of inner periphery guide section constituting members 15a and 15b constituting the inner periphery guide sections of the rolling direction changing passages. The support members 11, 12, 13, the escape passage constituting members 14, 14 and the paired inner periphery guide section constituting members 15a, 15b are formed respectively of resin independent from the block body 4, and these members are assembled to the block body 4 after the molding processes thereof.

According to this first embodiment of the present invention mentioned above, the support members 11, 12, 13, the escape passage constituting members 14, 14 and the paired inner periphery guide section constituting members 15a, 15b are formed of resin independently (separately) from the block body 4, shrinkage cavities (shrinkage amounts) of these members can be preliminarily calculated and then manufactured through the molding process. As a result, the support members 11, 12 and 13 having thin and long extensions and the escape passage constituting members 14, 14 are not flexed or adversely bent, and moreover, the inner periphery guide section constituting members 15a and 15b are also not opened (widened).

In the support members 11, 12 and 13, as shown in FIGS. 1 and 2, the first support member 11 supports the lower sides of the lower rollers 3, 3, - - -, 3, the second support member 12 supports the upper sides of the lower rollers 3, 3, - - -, 3 and the lower sides of the upper rollers 3, 3, - - -, 3 and the third support member 13 supports the upper sides of the upper rollers 3, 3, - - -, 3.

Figures 4A, 4B:
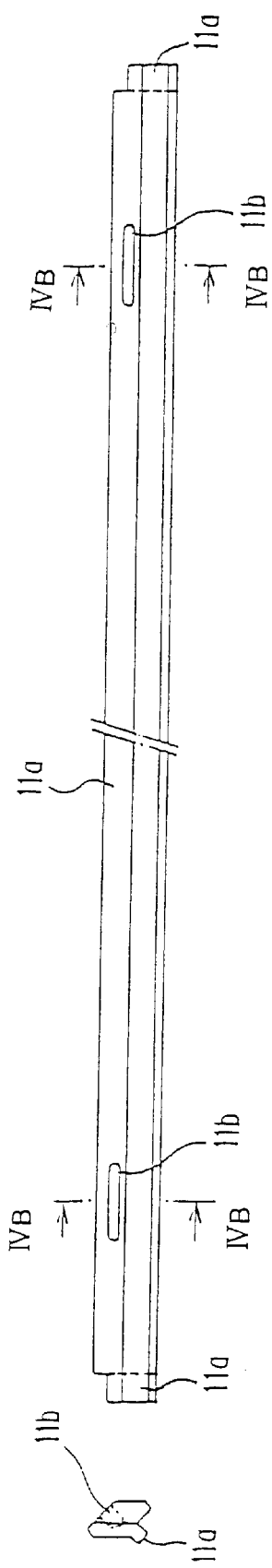
FIG. 4A is an illustrated side view of a first support member (retainer) and FIG. 4B is a sectional view taken along the line IVB—IVB in FIG. 4A.

FIG. 4 shows the first support member 11. The first support member 11 is formed of a resin material so as to provide a thin structure having a long scale. By incorporating the first support member 11 into the block body 4, a guide groove for guiding the side edge portion of the roller support belt is formed. This first support member 11 is mounted to the movable block 2 in a state that the first support member 11 is disposed between both the side lids 5, 5 and supported thereby at both longitudinal ends thereof. The first support member 11 is formed, at both end portions thereof, with protruded portions 11a, 11a, which are to be fitted into the side lids 5, 5. Furthermore, the side surface portions of the first support member 11 are formed with recessed portions such as slots 11b, 11b for positioning the first support member 11 with respect to the inner periphery guide section constituting members 15a and 15b.

FIG. 5 shows the second support member 12. The second support member 12 is also formed of a resin material so as to provide a thin structure having a long scale. The second support member 12 has both side portions on which guide grooves 12a, 12a are formed for guiding the side edge portions of the roller support belt 10. This second support member 12 is mounted to the movable block 2 in a state that the second support member 12 is disposed between the paired inner periphery guide section constituting members 15a, 15a and supported thereby at both longitudinal ends thereof. The second support member 12 is formed, at both end portions thereof, with protruded portions (protrusion) 12b, 12b, which are to be fitted into the inner periphery guide section constituting members 15a, 15a. Each of the protrusions 12b, 12b has a portion of rectangular section and a portion of circular section.

FIG. 6 shows the third support member 13. The third support member 13 is also formed of a resin material so as to provide a thin structure having a long scale. By incorporating the third support member 13 into the block body 4, a guide groove for guiding the side edge portions of the roller support belt 10 is formed. This third support member 13, like the first support member 11, is mounted to the movable block 2 in a state of being disposed between both the side lids 5, 5 and supported thereby at both longitudinal ends thereof. The third support member 13 is formed, at both end portions thereof, with protruded portions 13a, 13a, which are to be fitted into the side lids 5, 5. Furthermore, the side surface portions of the third support member 13 are formed with recessed portions such as slots 13b, 13b for positioning the third support member 13 with respect to the inner periphery guide section constituting member 15a, 15a.

As shown in FIG. 1, the escape passage constituting members 14, 14 are composed of a pair of pipe halves 14a, 14b formed by dividing a pipe along the axial direction of the pipe. Each of these pipe halves 14a, 14b is provided with a groove conformed with the shape of the roller 3 in the axial direction, a guide groove guiding a belt side edge portion 10d and a flange 19 extending in the longitudinal direction along both the side edges of the grooves. Each of these pipe halves 14a, 14b has a length slightly longer than the length of the block body 4. The escape passage constituting members 14, 14, each being formed by assembling the pipe halves 14a, 14b, are positioned at their both end portions to recessed portions 42, 42 (mentioned hereinlater) of the inner periphery guide section constituting members 15a, 15a, and, in a state that both the end portions of the escape passage constituting members are supported, are fixed to the movable block 2 through the inner periphery guide section constituting members 15a, 15a. To both the end portions of the escape passage constituting members 14, 14 are formed positioning protrusion (protruded portions) 20 for positioning the escape passage constituting members 14, 14 with respect to the inner periphery guide section constituting members 15a, 15a.

Figure 8C:
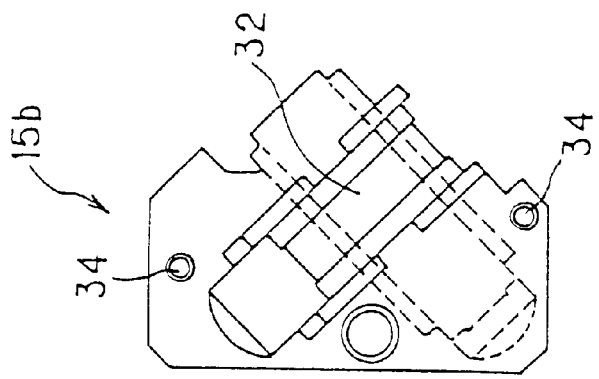
FIG. 8 shows an outer side inner periphery guide section constituting member and includes FIG. 8A being a front view thereof, FIG. 8B being a side view thereof and FIG. 8C being a back side view thereof.
Figure 8B:
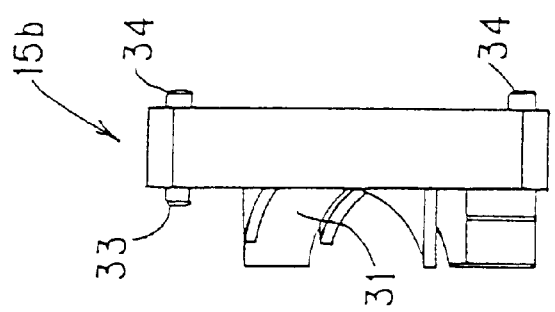
Figure 8A:
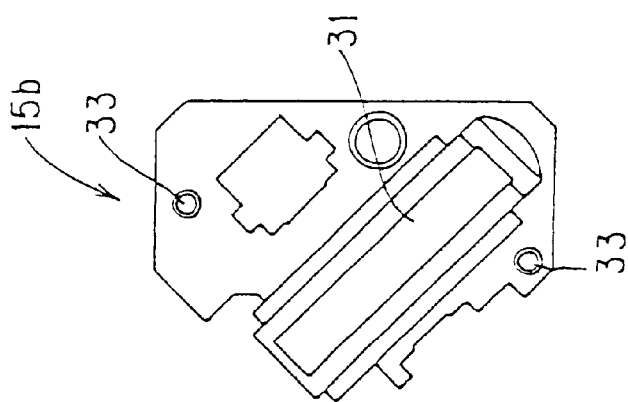

FIGS. 7 and 8 represent the inner periphery guide section constituting members 15a and 15b, respectively. Each of the inner periphery guide section constituting members 15a and 15b is composed of a divided blocks divided into tow parts along the longitudinal direction of the track rail 1. These two divided blocks are combined, and the U-shaped direction changing passages, which have grade separation structures, are formed. The grade separation direction changing passages have rectangular shapes in cross sections. Furthermore, The direction changing passage is formed with a guide groove for guiding the side edge portions 10d, 10d of the roller support belt 10.

FIG. 7 shows an inner side divided block (i.e., the inner periphery guide section constituting member). The divided block 15a on the side of the movable block 2 (i.e., inner side divided block) is formed with an inner periphery guide section 21 of the inner peripheral side roller circulation passage. This inner periphery guide section 21 is formed to provide approximately semicircular shape. The inner side divided block 15a has a front surface portion 22 abutting against the block body 4 and the front surface portion 22 is formed with positioning protrusions (protruded portions) 23 for positioning the divided block with respect to the block body 4. The block body 4 is formed with positioning recessed portions for positioning the block body to be fitted to the positioning protrusions 23 (see FIG. 1). Further, there are also formed, on the front surface portion 22, positioning recessed portions 42, 42 for positioning escape passage groove constituting members 14, 14, to which are fitted the positioning protrusions 20, 20, mentioned hereinbefore, for positioning the escape passage section constituting members 14, 14. The positioning protrusions 20, 20 for positioning the escape passage groove constituting members 14, 14 have flanged portions which are fitted to expanded portions 42a, 42a of the recessed portions for positioning the escape passage section constituting members, whereby the escape passage section constituting members 14, 14 are prevented from being rotated. Furthermore, the front surface portion 22 is further formed with a positioning recess 25 for positioning a second support member 12 with respect to the divided block 15a, and this second support member positioning recess 25 is fitted with the second support member positioning protrusion 12b mentioned hereinbefore. The divided block 15a is formed, at its side surface, with a first support member positioning protrusion 26 for positioning the first support member 11 and a third support member positioning protrusion 27 for positioning the third support member 13 with respect to the divided block 15a. These first and third support member positioning protrusions 26 and 27 are fitted to the first and third support member positioning recesses 11b and 13b, respectively. Further, divided block positioning recesses 28, 28 for positioning the other, i.e. outer divided block 15b with respect to the inner divided block 15a are formed on the back surface of the divided block 15a.

FIG. 8 represents the outer (side lid side) divided block 15b. The outer divided block 15b is formed with an outer periphery guide section 31 of the inner side roller circulation passage and an inner periphery guide section 32 of the outer side roller circulation passage. These inner and outer periphery guide sections 32 and 31 have substantially semi-circular shapes. Further, the outer divided block 15b is formed with divided block positioning protrusions 33, 33 fitted to the divided block positioning recesses 28, 28 formed on the inner side divided block 15a. Furthermore, side lid positioning protrusions 34, 34 for positioning the outer divided block 15b with respect to the side lids 5, 5 are formed on the back surface of the outer divided block 15b.

Figure 9:
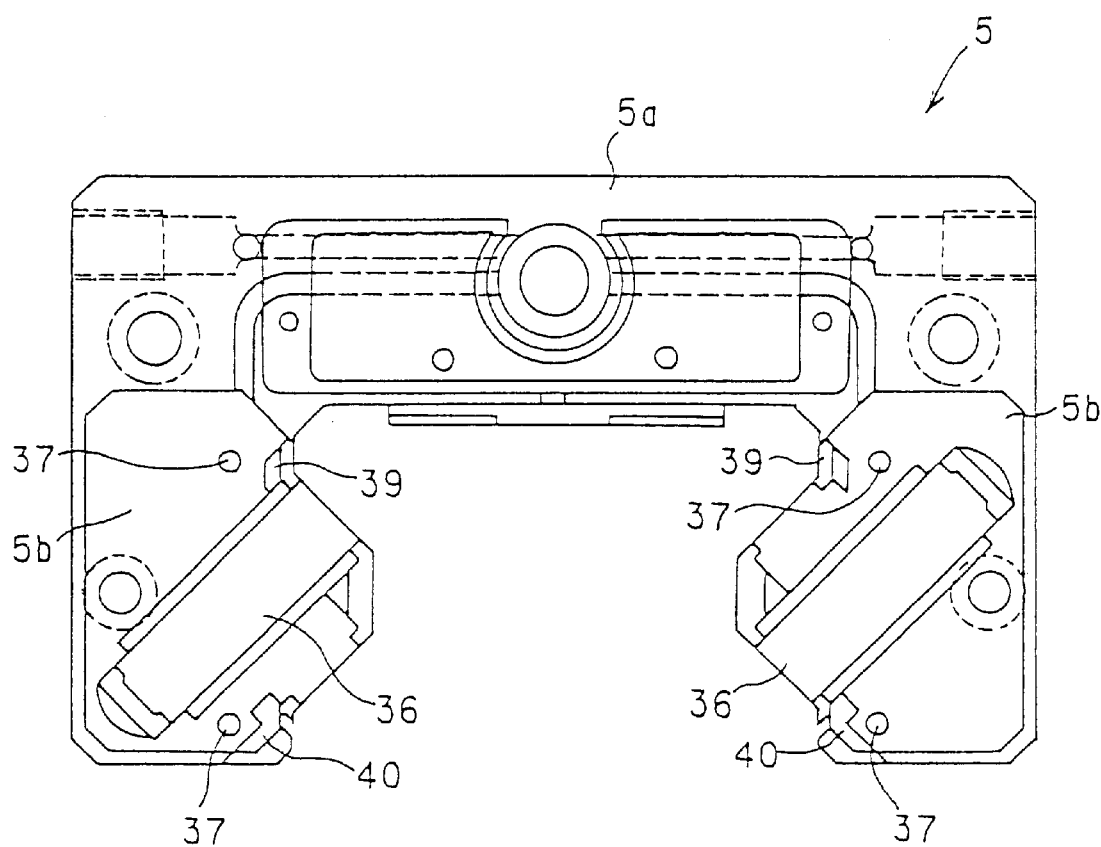
FIG. 9 is a side view of a side lid (end plate) mounted to longitudinal end surfaces of a block body.

FIG. 9 represents the side lid (i.e., longitudinal endplate) 5 having a sectional shape corresponding to that of the block body 4 and provided with horizontal flat portion 5a and a sleeve, i.e. side skirt, portions 5b, 5b, on which outer periphery guide section 36, 36 of the outer peripheral side roller circulation passage is formed. Furthermore, the inner periphery guide section constituting members 15a and 15b in the state assembled together are fitted to these sleeve portions 5b, 5b. The sleeve portions 5b, 5b are formed with side lid positioning recesses 37, 37 for positioning the side lid 5 which are fitted with the side lid positioning protrusions 34, 34 formed on the outer divided block 15b. Still furthermore, the sleeve portions 5b, 5b are formed with recesses 39 and 40 into which the protrusions 11a and 13a of the first and third support members 11 and 13 are forcibly inserted.

As shown in FIG. 1, the side lids 5, 5 are mounted to both longitudinal ends of the block body 4. Bolts are inserted into bolt insertion holes formed on the side lids 5, 5 and the bolts are screwed into screw holes formed on the end surfaces of the block body 4, whereby the side lids 5, 5 are fastened and fixed to the block body 4, and accordingly, the inner periphery guide section constituting members 15a, 15b are fixed to the block body 4. Further, decorative plates 38, 38 are attached to the outer side portions of the side lids 5, 5.

Incidentally, in a case where the support members 11, 12, 13, the escape passage constituting members 14, 14, and the inner periphery guide section constituting members 15a, 15b are formed out of resin material independently from the block body 4 and also independently from each other, there may cause fears such that the number of constitutional members or parts for constituting the motion guide device is increased and the assembling working thereof will be made difficult and troublesome. On the other hand, according to the present invention, as mentioned above, the support members 11, 12, 13 and the escape passage constituting members 14, 14 are positioned with reference to the inner periphery guide section constituting member 15a which is positioned to the block body 4, so that the support members 11, 12, 13 and the escape passage constituting members 14, 14 can be positioned with high precision to the block body 4. As a result, even in the case where the support members 11, 12, 13, the escape passage constituting members 14, 14, and the inner periphery guide section constituting members 15a, 15b are formed independently from the block body 4 and from each other, these circulation passage forming members do not interfere the motion of the rollers. Furthermore, the support members 11, 12, 13 and the escape passage constituting members 14, 14 are positioned and assembled with the inner periphery guide section constituting member 15a being as one reference member, so that the inner periphery guide section constituting members 15a, 15b, the support members 11, 12, 13 and the escape passage constituting members 14, 14 can be easily assembled with high reproductivity.

The roller support belt 10 is supported by guide grooves 43 (FIG. 21) formed by the support members 11, 12, 13 and the block body 14 so as to prevent rollers 3, 3, - - -, 3 from coming off from the movable block 2. The rollers 3, 3, - - -, 3 are supported by the roller support belt 10. Accordingly, the roller support belt 10 and the rollers 3, 3, - - -, 3 never come off from the movable block 2. Further, the rollers 3, 3, - - -, 3 are guided in the predetermined track by the contact of the support members 11, 12, 13 at the axial end surfaces of the rollers 3, and hence, the generation of inclination of the rollers 3 with respect to their rotation axes, so-called, the generation of skew can be prevented.

Next, the method of assembling such motion guide device will be described hereunder. The assembling of the motion guide device is performed along the steps or processes represented by FIGS. 10 to 16.

Figure 10:
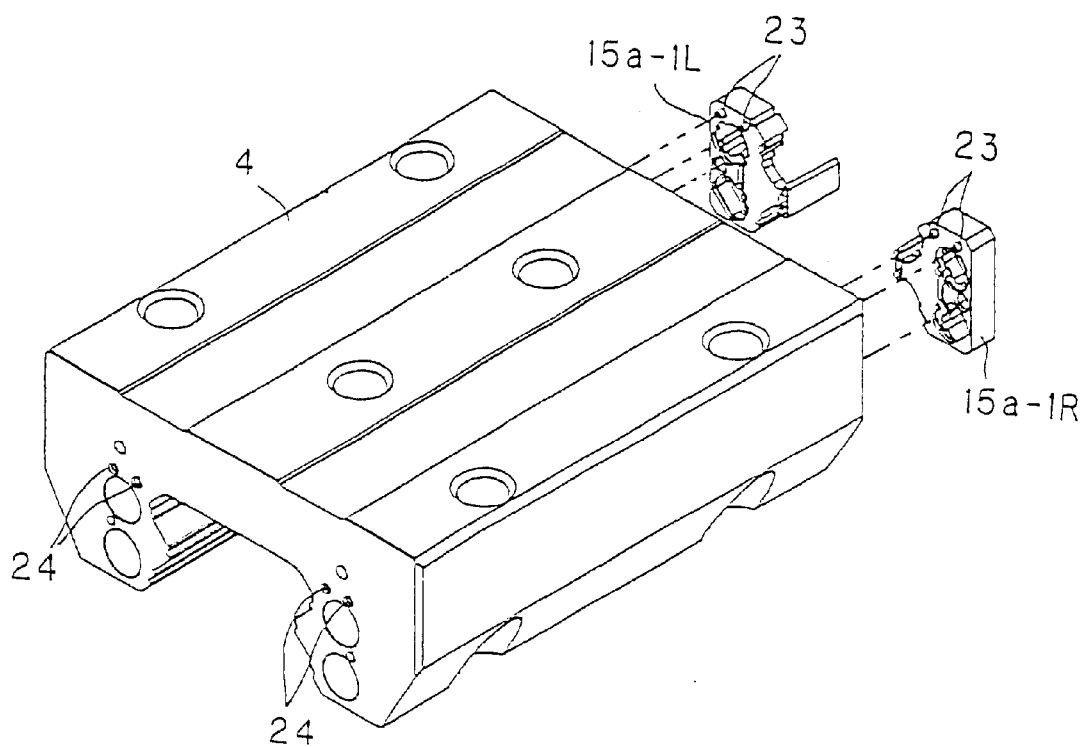
FIG. 10 is a developed perspective view showing a step for assembling the linear motion guide device, in which the inner periphery guide section constituting member (inner divided block) (on one side) is mounted to the block body.

First, as shown in FIG. 10, the inner divided blocks 15a-1L and 15a-1R of the inner periphery guide section constituting member are fixed to one end side, and to left and right sides, of the block body 4. Further, it is to be noted, for the sake of easy understanding of the explanation, that references "−1" and "−2" are additionally applied to the reference numerals of the respective members or elements which are disposed to one and the other end sides of the block body 4 and, furthermore, the capitals "L" and "R" are further added to "−1" and "−2" to elements or members disposed on left and right sides of the block body 4, for example, as shown in FIG. 10, such as 15a-1L or 15a-1R.

The mounting of these divided blocks 15a-1L and 15a-1R with respect to the block body 4 will be completed by fitting the positioning protrusions 23 formed on the divided blocks 15a-1L and 15a-1R into the positioning recesses 24 formed on the end surfaces of the block body 4.

Figure 11:
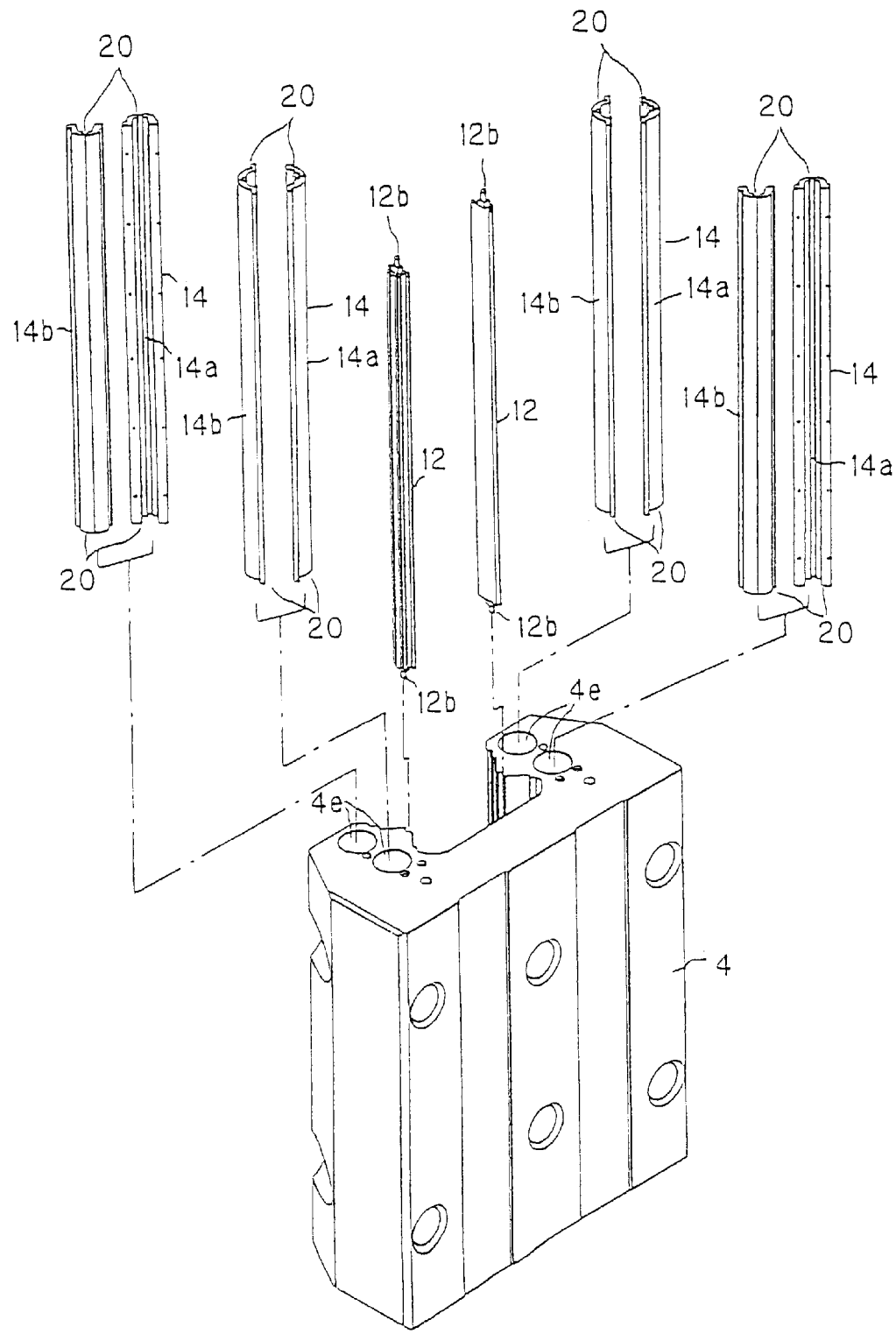
FIG. 11 is a developed perspective view showing an assembling process of the linear motion guide device, in which an escape passage constituting member and the second support member are mounted to the block body.

In the next step shown in FIG. 11, the escape passage constituting members 14 are inserted respectively into four slots (long holes) of the block body 4 from the side opposite to the other side of the block body 4, i.e., mounting side of the divided blocks 15a-1L and 15-1R. These escape passage constituting members 14 are each composed of pipe members 14a, 14b in combination thereof, and the positioning protrusions 20 for positioning the escape passage constituting members 14 are engaged with the positioning recesses 42 for positioning the escape passage constituting members of the divided blocks 15a-1L and 15a-1R with the positioning protrusions 20 being disposed upper side.

Figure 17:
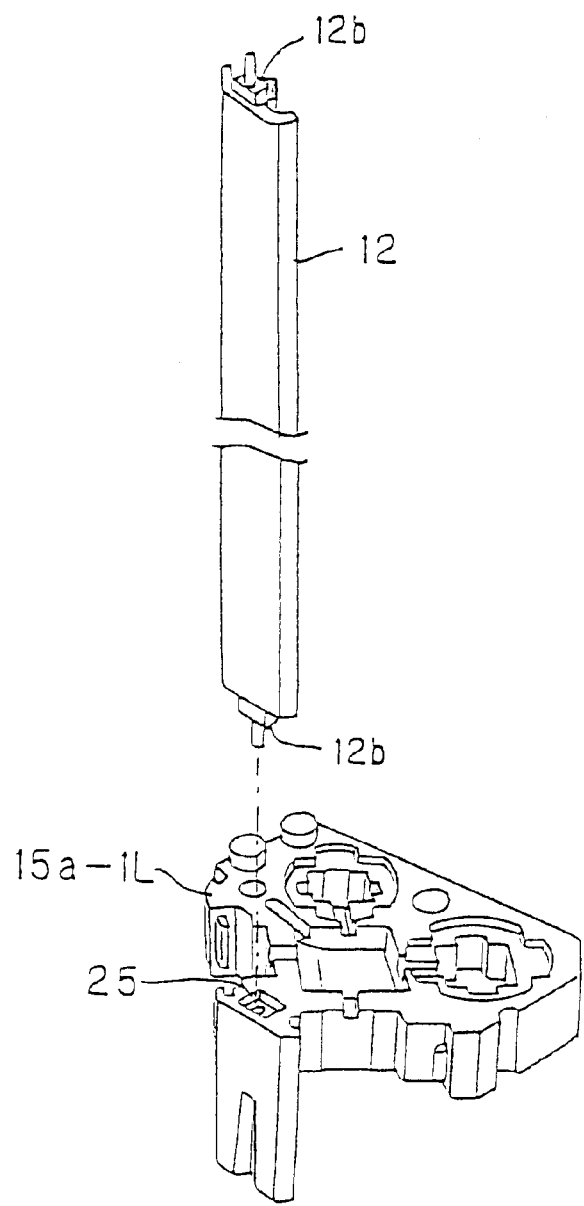
FIG. 17 is a perspective view showing a detail of mounting the second support member to the inner periphery guide section constituting member (inner divided block)

Further, as shown in FIG. 11, a pair of second support members 12 are mounted. More in detail, as shown in FIG. 17, the positioning protrusions 12b for positioning the second support members on one end side of the second support members 12 are engaged with the second positioning recesses 25 formed on the divided blocks 15a-1L and 15a-1R with the positioning protrusions 12b being disposed upper side.

Figure 12:
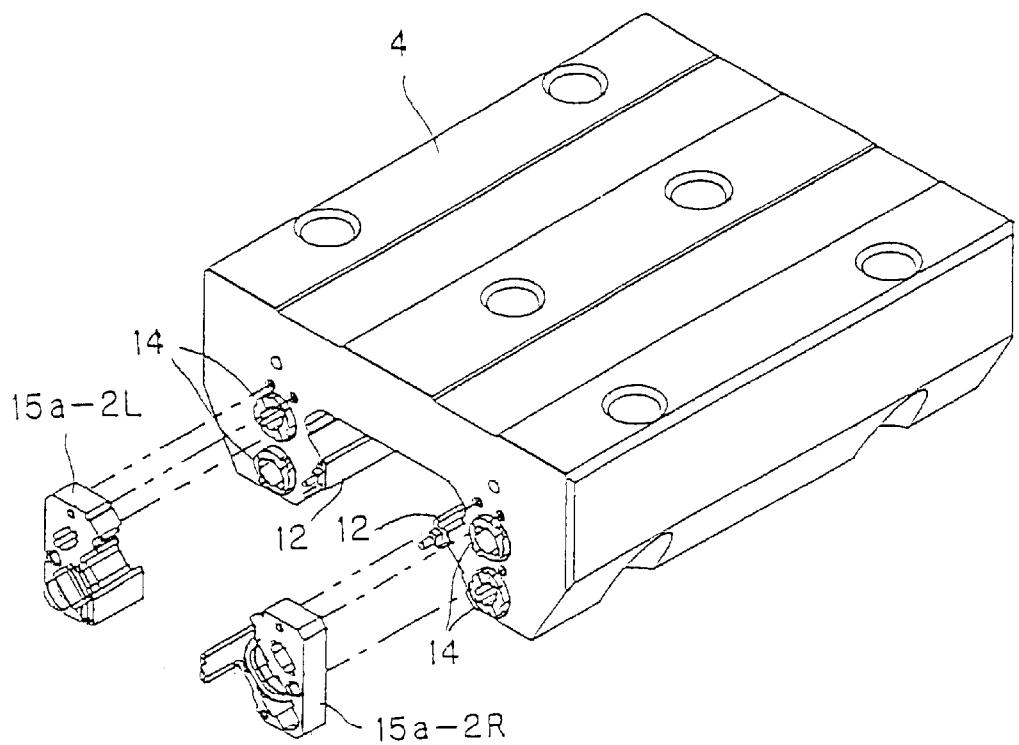
FIG. 12 is a developed perspective view showing an assembling process of the linear motion guide device, in which the inner periphery guide section constituting member (inner divided block) (on the other side) is mounted to the block body.
Figure 13:
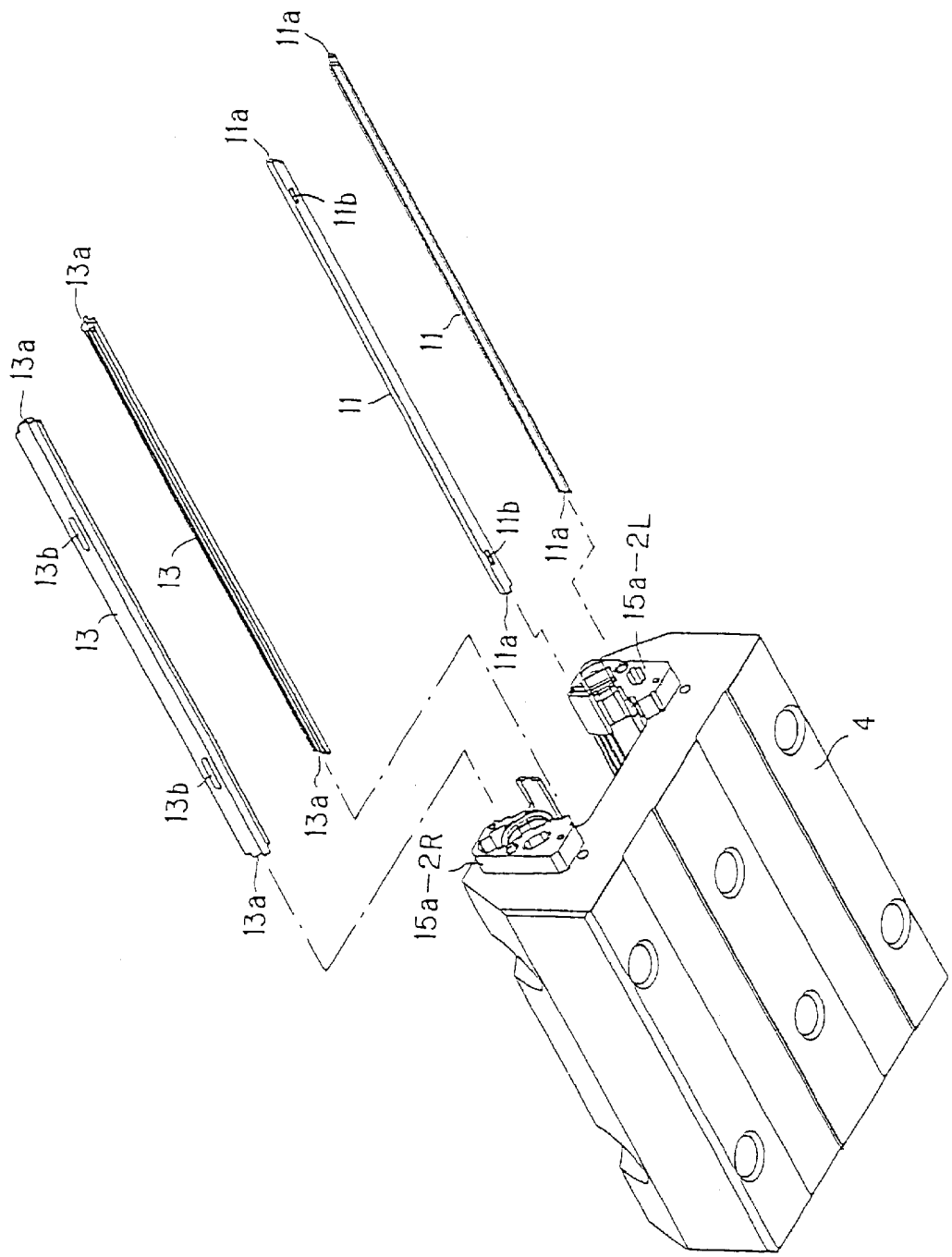
FIG. 13 is a developed perspective view showing an assembling process of the linear motion guide device, in which the first and third support members are mounted to the block body.

Next, with reference to FIG. 12, the inner divided blocks 15a-2L and 15a-2R of the other side lateral inner periphery guide section constituting members are mounted to the other side end portions of the block body 4. These divided blocks 15a-2L and 15a-2R are also positioned to the block body 4, as like as the divided blocks 15a-1L and 15a-1R mentioned before, by fitting the positioning protrusions 23 formed on the divided blocks into the positioning recesses 24 formed on the block body 4. Furthermore, the positioning recesses 42 for the escape passage constituting members of the divided blocks 15a-2L and 15a-2R are then engaged with the positioning protrusions 20 of the other end side escape passage constituting members 14 which have already been mounted to the block body 4, respectively, and at the same time, the positioning recesses 25 of the respective second support members of the divided blocks 15a-2L and 15a-2R are engaged with the protrusions for positioning the second support member on the other side thereof. According to the described manner, the respective inner divided blocks 15a-1L, 15a-1R, 15a-2L, 15a-2R, the escape passage constituting members 14 and the second support members 12 are united with respect to the block body 4 in the firm engaging state requiring no pressing force of, for example, finger pressing to thereby prevent them from coming off from the block body 4.

Under the state mentioned above, as shown in FIG. 13, the first support member 11 and the third support member 13 are mounted to the block body 4. Specifically, for example, with respect to the first support member 11, as shown in FIGS. 18(a) and (b), the positioning recesses 11b for positioning the first support member formed on both end portions of the first support member 11 are engaged with the positioning protrusions 26 for positioning the first support member of the divided block 15a-1L (further, since substantially the same is applicable to the other divided blocks 15a-1R, 15a-2L and 15a-2R, only the case of the divided block 15a-1L will be discussed herein).

Figure 19:
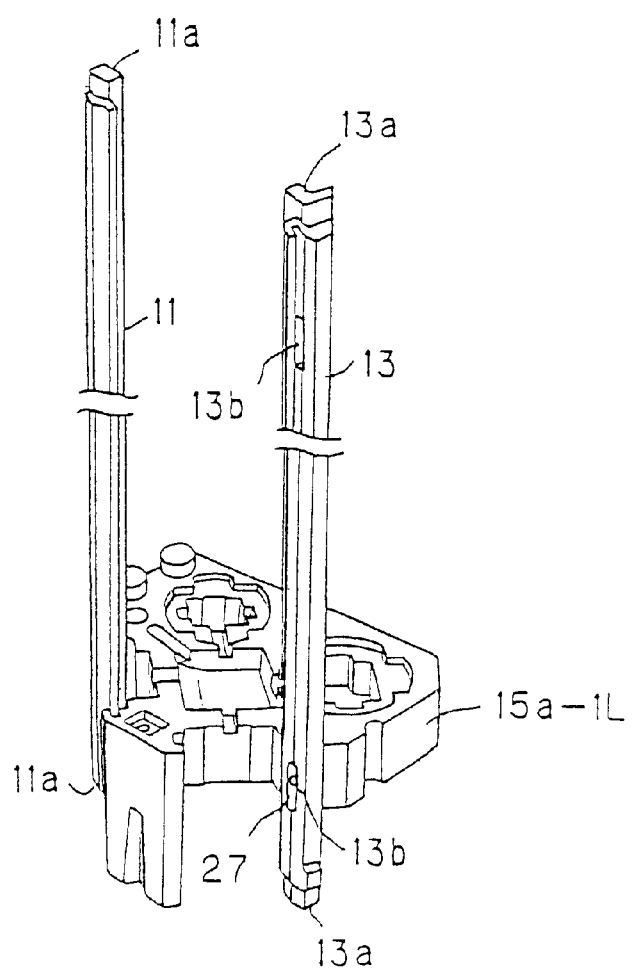
FIG. 19 is a perspective view showing a detail of mounting the first and third support members to the inner periphery guide section constituting members (inner divided block)

Furthermore, as shown in FIG. 19, substantially the same matter as that mentioned above will be described with respect to the third support member 13. That is, the positioning recesses 13b for positioning the third support member formed on both end portions of the third support member 13 are engaged with the positioning protrusions 27 for positioning the third support member of the divided block 15a-1L (further, substantially the same is applicable to the other divided blocks 15a-1R, 15a-2L and 15a-2R).

Further, the engagements between the recesses 11b for positioning the first support member and the positioning protrusions 26 for positioning the first support member and between the recesses 13b for positioning the third support member and the positioning protrusions 27 for positioning the third support member are made with a little close fit state, and after the fitting, these support members never come off from the block body, with no support, by means of, for example, fingers.

Figure 14:
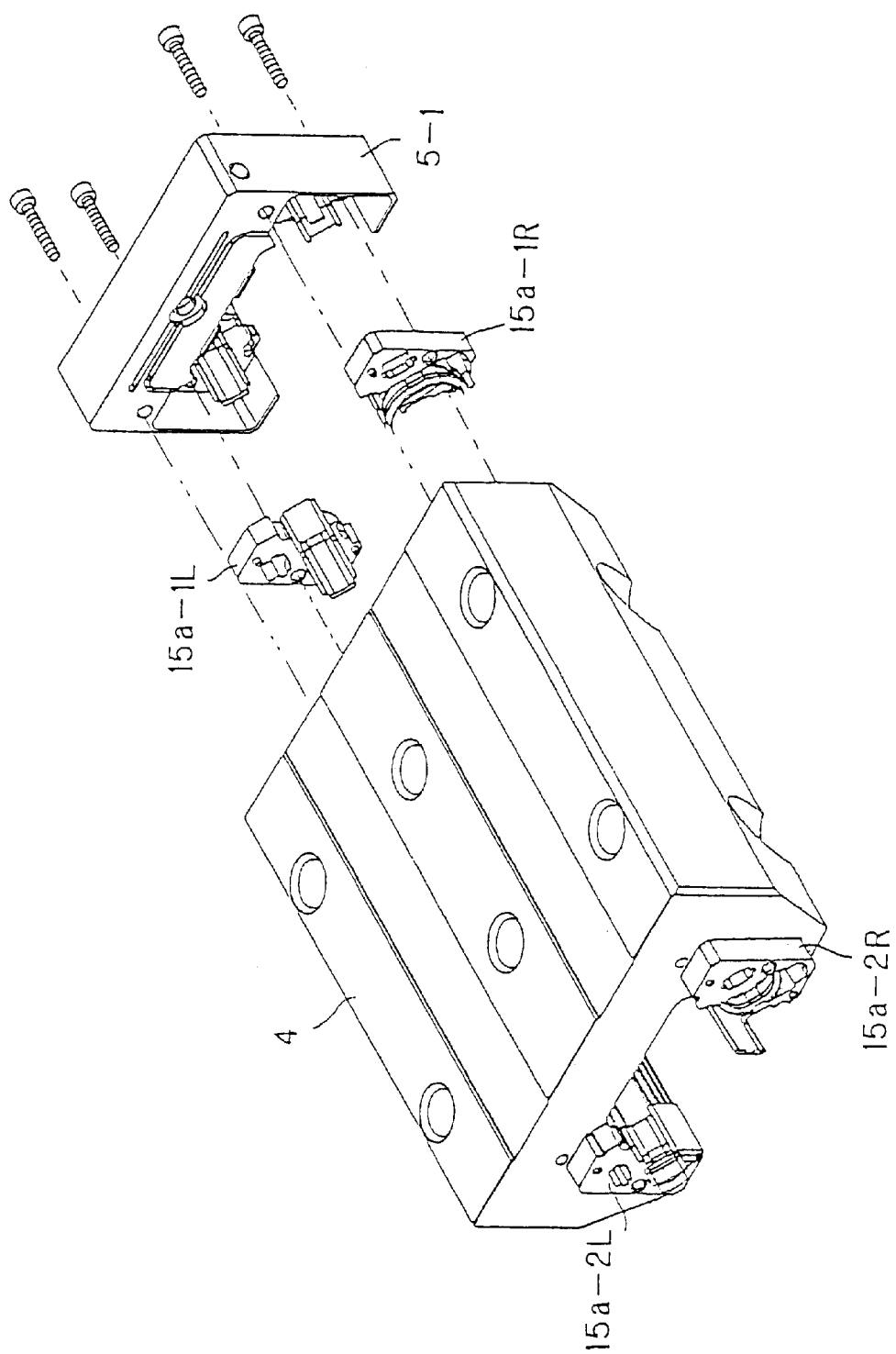
FIG. 14 is a developed perspective view showing an assembling process of the linear motion guide device, in which the inner periphery guide section constituting member (outer divided block) (on one side) is mounted to one end surface of the block body and a side lid is mounted to this end surface of the block body.
Figure 20A:
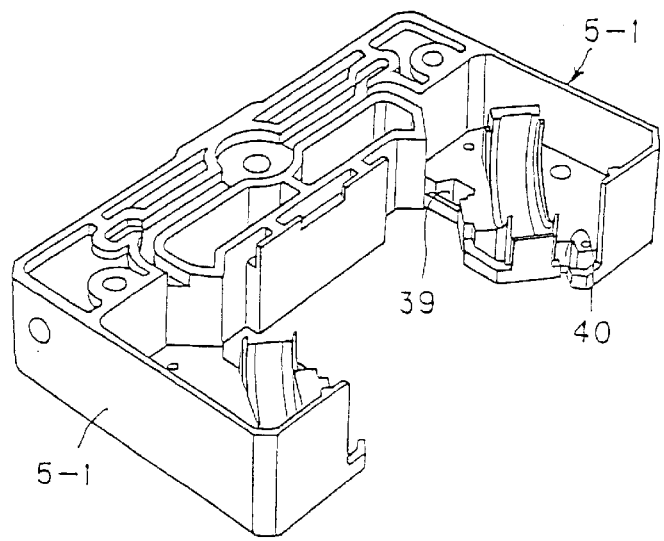
FIG. 20A represents a state before the insertion and FIG. 20B represents a state after the insertion.
Figure 20B:
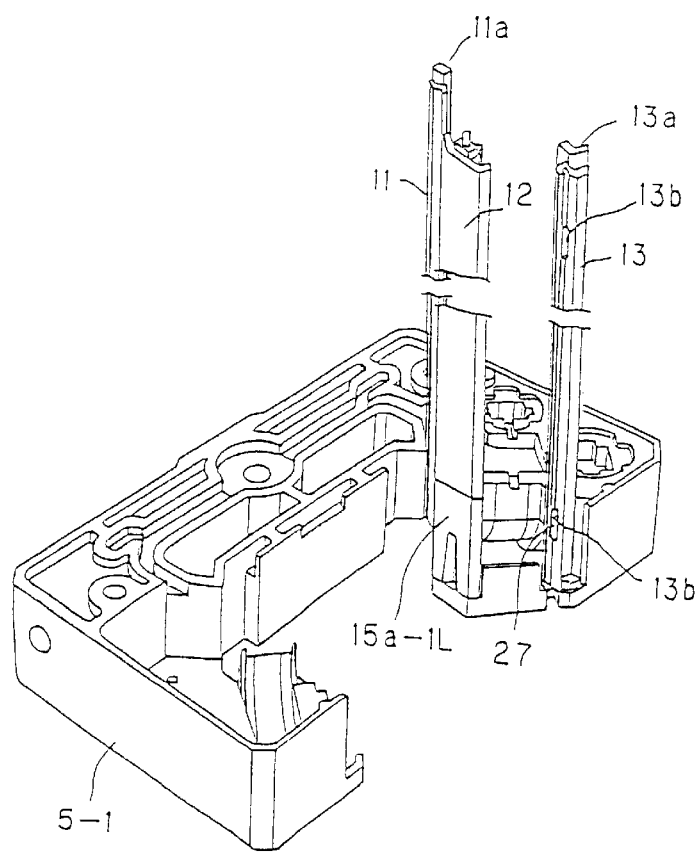

Next, as shown in FIG. 14, the outer divided blocks 15b-1L, 15b-1R of the inner periphery guide section constituting members are mounted to bilateral both sides on one end side portion of the block body 4, and the side lid 5-1 is further attached to this one end side portion. More in detail, with reference to the divided blocks 15b-1L and 15b-1R, the divided block positioning protrusions 33 formed thereto are engaged with the divided block positioning recesses 28 formed on the inner divided blocks 15a-1L and 15a-1R, respectively. On the other hand, with reference to the side lid 5-1, as shown in FIGS. 20(a) and (b), the protrusions 11a and 13a formed on the first and third support members 11 and 13 are inserted into and then mounted to the recesses 39 and 40, respectively, formed on the divided blocks 15a-1L and 15a-1R, and then, fastened to the block body 4 by means of bolts.

Figure 15:
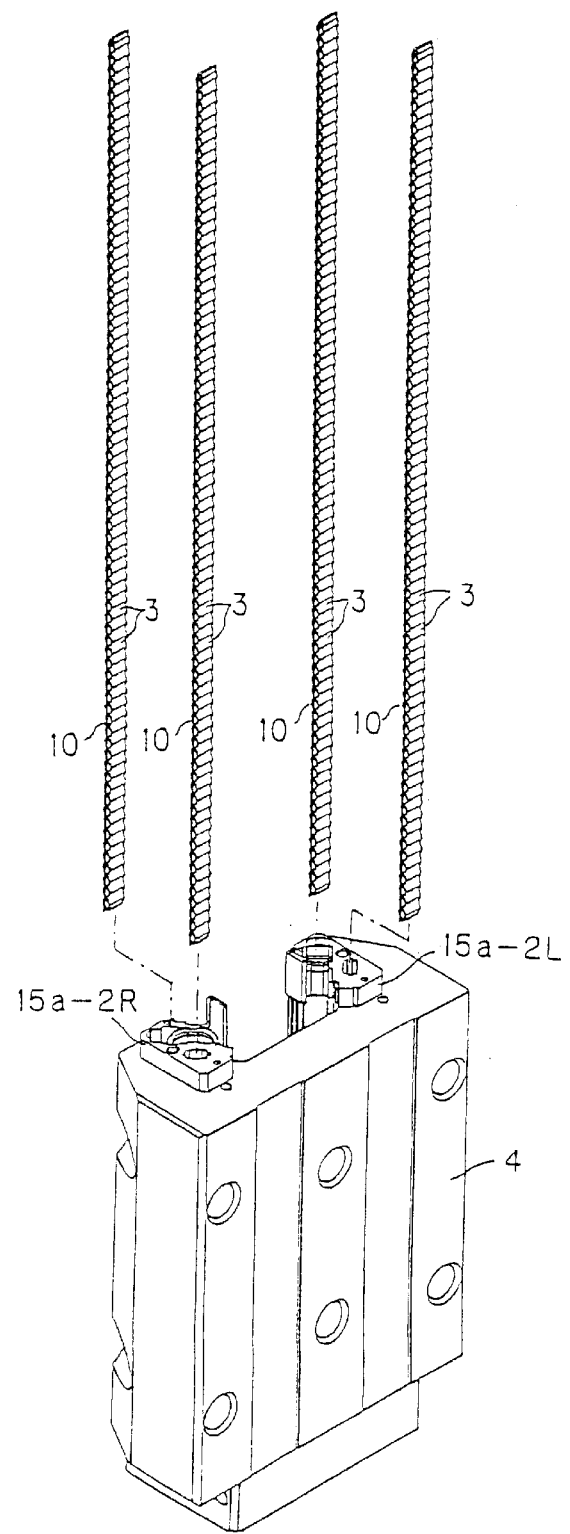
FIG. 15 is a developed perspective view showing an assembling process of the linear motion guide device, in which rollers held by roller support belts are fitted to the block body.

Thereafter, as shown in FIG. 15, the rollers 3, 3, - - - , 3 (four rows) aligned and supported by the roller support belts 10 are inserted into the respective roller circulation passages from the other side of the block body 4, i.e. the side opposite to the side lid mounting side.

Figure 16:
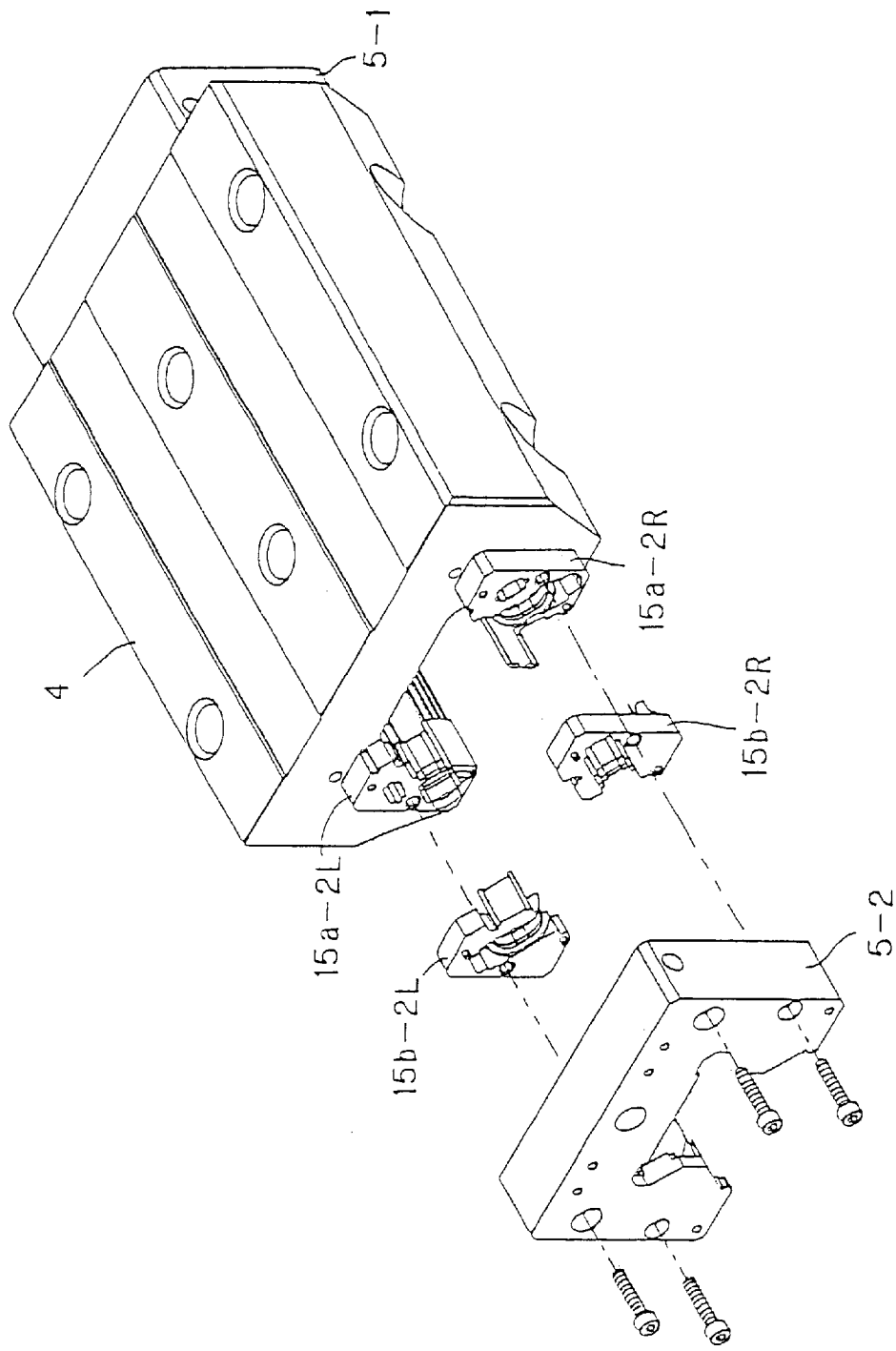
FIG. 16 is a developed perspective view showing an assembling process of the linear motion guide device, in which the inner periphery guide section constituting member (outer divided block) (on the other one side) is mounted to the other one end surface of the block body and the other side lid is mounted to this other end surface of the block body.

Then, as shown in FIG. 16, the outer periphery divided blocks 15b-2L, 15b-2R and the side lid 5-2 are mounted to the other side end portion of the block body 4. The mounting of these outer periphery divided blocks 15b-2L, 15b-2R and the side lid 5-2 is performed by substantially the same manner as that performed for the mounting of the outer periphery divided blocks 15b-1L, 15b-1R and the side lid 5-1 on the one side of the block body 4 mentioned before. Now, since the support members 11 and 13 are positioned by the inner divided blocks 15a-1L, 15a-1R and the side lid 5-1, the support members are positioned at two portions in the longitudinal direction thereof. Accordingly, in the assembling process, there is no fear of tilting (falling) and the side lid 5-2 can be simultaneously inserted into a plurality of support members 11 and 13, thus making easy the assembling process.

Figure 21:
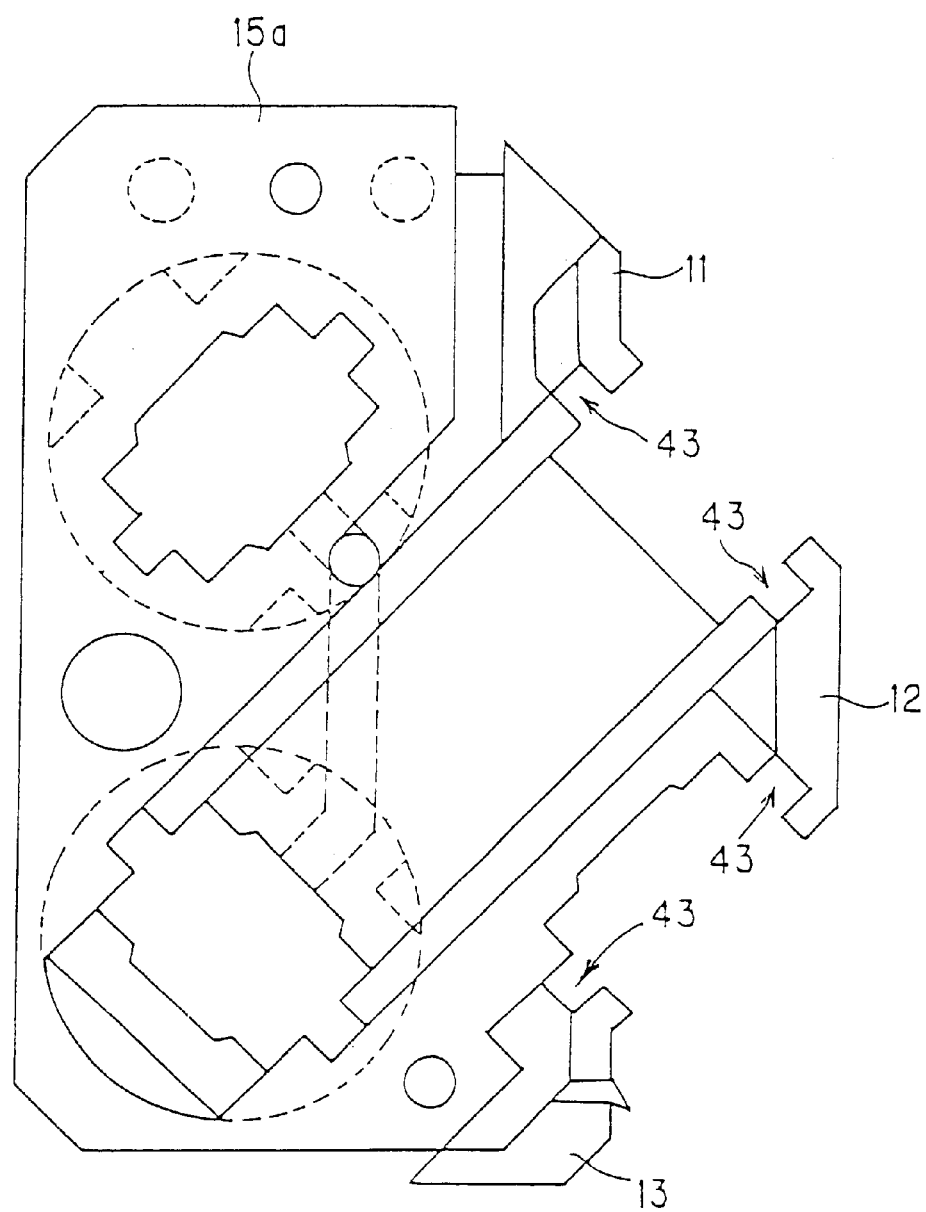
FIG. 21 is a front view showing the inner periphery guide section constituting member to which the first and third support members are mounted.

FIG. 21 represents the inner periphery guide section constituting member 15a mounted with the first, second and third support members 11, 12 and 13. By assembling the inner periphery guide section constituting member 15a mounted with the first, second and third support members 11, 12 and 13, the guide grooves 43, 43, - - - guiding the side edge portions 10d of the belt portions 10a of the roller support belts 10 in the loaded area are formed. The guide groove 43 can attain the functions of preventing the roller support belt 10 from being swung at the time of rolling motion of the rollers 3, 3, - - - , 3 and preventing the belt portion 10a from coming off through engagement of the side edge portion 10d of the belt portion 10 at the time of removing the movable block 2 from the track rail 1. The rollers 3 are held by the roller support belt 10 so as not to come off therefrom to thereby support without coming off from the movable block 2 by way of the roller support belt 10.

Figure 22:
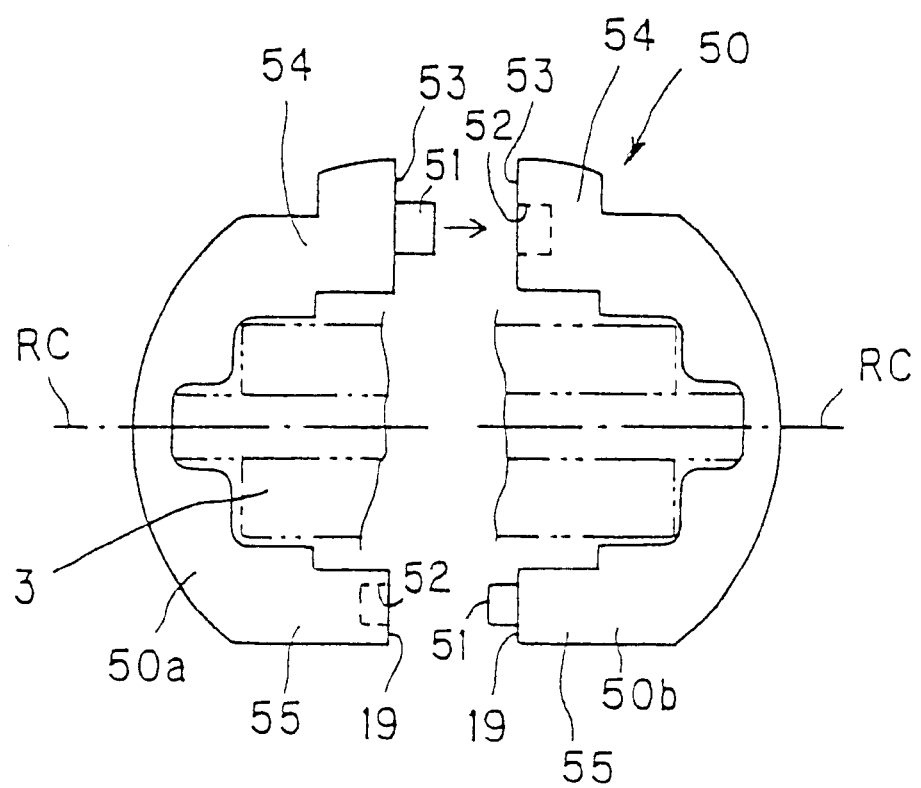
FIG. 22 is a disassembled view showing another example of the escape passage constituting members.

FIG. 22 shows a disassembled view of another example of the escape passage constituting member. This escape passage constituting member 50 is composed, as like as the escape passage constituting member 14 mentioned hereinbefore, by assembling a pair of pipe halves 50a, 50b divided in a direction perpendicular to the axial direction of a pipe. The respective pipe halves 50a, 50b have flanged portions 53, 53 on which positioning protrusion and recess 51 and 52 are formed, respectively. The flanged portions 53, 53 constituting the divided surfaces of the pipe halves 50a, 50b intersect at right angle with respect to the axial line RC of the roller 3 so as to be parallel to a plane including the circulation passage. The escape passage constituting member 50 is formed bilaterally asymmetrically with respect to the axial line RC of the roller 3. According to such structure, the escape passage constituting member 50 has a shape different on the inner peripheral side 55 and the outer peripheral side 54 of the circulation passage. As shown in FIG. 11 mentioned before, the escape passage constituting member 50 is inserted into four slots 4a of the block body 4. The positioning recesses 42 for positioning the escape passage constituting member, in conformity with the sectional shape thereof, are formed on the inner divided blocks 15a-1L and 15a-1R so as to be fitted with the positioning protrusions formed on both the axial end portions of the escape passage constituting member 50.

As shown in FIG. 22, according to the structure in which the inner peripheral side 55 and the outer peripheral side 54 of the circulation passage of the escape passage constituting member 50 are made different in shapes from each other, there is no fear of causing the erroneous insertion of the inner peripheral side 55 and the outer peripheral side 54 of the escape passage constituting member 50 during the insertion working thereof into the block body 4. On the other hand, in an arrangement in which the escape passage constituting member 50 is formed laterally symmetrically with respect to the axial line RC of the roller 3, it is inevitable to cause a fear of erroneous insertion of the inner peripheral side 55 and the outer peripheral side 54 of the escape passage constituting member 50 during the insertion working thereof into the block body 4.

Further, in the described embodiment, although four rows of the roller rolling surfaces 1*b*, 1*b* and the loaded roller rolling surfaces 4*d*, 4*d* are formed (two in each lateral side), the number of these rows may be variously set on the basis of kinds of rolling motion guide devices. Furthermore, although the inner periphery guide section constituting members 15*a*, 15*b* are divided into two blocks and the direction changing passages are formed on the inner periphery guide section constituting members 15*a*, 15*b* so as to intersect as grade separation structure, it is not necessary to divide the inner periphery guide section constituting members 15*a*, 15*b* in accordance with the form of the circulation passage. Still furthermore, balls may be also utilized as rolling members in place of the rollers 3.

Moreover, in the described embodiment, although the linear motion guide device was described, the present invention may be applied to a curvilinear motion guide device guiding a curved motion.

Furthermore, in the described embodiment, although the escape passage is composed of a pipe-shaped escape passage constituting member, the escape passage may be formed by a through-hole perforated in the block body.

As mentioned hereinbefore, according to the present invention, the support members, the escape passage constituting members and the inner periphery guide section constituting members constituting the rolling member circulation passages are formed respectively of resin material independent (separately) from the body of the movable member and these members are assembled with the body of the movable member. Accordingly, the respective shrinkage cavity amounts of the support members, the escape passage constituting members and the direction changing passages are preliminarily calculated and manufactured according thereto. As a result, the thin and long-scale support members and escape passage constituting members can be prevented from being bent or flexed and the inner periphery guide section constituting members can be also prevented from being opened.

What is claimed is:

1. A motion guide device which comprises a track member provided with a rolling member rolling portion and a movable member disposed to be movable along the track member through a number of rolling members and in which said movable member is provided with a loaded rolling member rolling portion corresponding to the rolling member rolling portion of the track member, a rolling member escape passage disposed in parallel to the loaded rolling member rolling portion with a predetermined distance and a pair of direction changing passages connecting the loaded rolling member rolling portion and the rolling member escape passage to thereby circulate the rolling members, wherein support members extending along both side edges of the loaded rolling member rolling portion, escape passage constituting members constituting the rolling members escape passages and a pair of inner periphery guide section constituting members constituting the inner peripheral portions of the direction changing passages, being made of resin, are formed to be independent from a body of the movable member and also independent from each other and are assembled to the body of the movable member, and wherein a pair of side lids constituting outer periphery guide sections of the direction changing passages are mounted to both longitudinal end portions of the movable member body, both the end portions of said support member are inserted into said side lids, and either one of the inner periphery guide section constituting member and the support member is formed with a positioning recess for positioning the support member with respect to the inner periphery guide section constituting member and the other one thereof is formed with a support member positioning protrusion to be engaged with said support member position recess.

2. A motion guide device according to claim 1, wherein said support members act to prevent the rolling members from coming off from the loaded rolling member rolling portion at a time when the movable member is removed from the track member.

3. A motion guide device according to claim 1 or 2, wherein:

either one of the inner periphery guide section constituting member and the body of the movable member is formed with a positioning recess for positioning the inner periphery guide section constituting member with respect to the body of the movable member and the other one thereof is formed with a movable member body positioning protrusion to be engaged with said movable member body positioning recess;

either one of the inner periphery guide section constituting member and the escape passage constituting member is formed with a positioning recess for positioning the escape passage constituting member with respect to the inner periphery guide section constituting member and the other one thereof is formed with an escape passage constituting member positioning protrusion to be engaged with said escape passage constituting member positioning recess; and either one of the inner periphery guide section constituting member and the support member is formed with a positioning recess for positioning the support member with respect to the inner periphery guide section constituting member and the other one thereof is formed with a support member positioning protrusion to be engaged with said support member positioning recess.

4. A motion guide device according to claim 1 or 2, wherein a number of rolling members are held in series with predetermined distance by a rolling member support belt having side edge portions projecting over both side end portions of the rolling members, and by assembling the support member to the body of the movable member, a guide section for guiding the side edge portions of the rolling member support belt is formed.

5. A motion guide device according to claim 1 or 2, wherein said track member is a track rail and said movable member is a movable block provided with a pair of sleeve portions disposed so as to oppose to both side surfaces of the track rail, said rolling member rolling portion includes vertical two rows of rolling member rolling passages formed on each of lateral side surfaces of the track rail, totally, four rows thereof, said loaded rolling member rolling portion includes vertical two rows of loaded rolling member rolling passages formed on each of inner side surfaces of the lateral sleeve portions of the movable block, totally, four rows thereof, said escape passage constituting passage includes vertical two rows thereof formed on each of the lateral sleeve portions of the movable block, totally, four rows thereof, said direction changing passage and a lower rolling member escape passage and connect an lower loaded rolling member rolling passage and an upper rolling member escape passage so as to provide a grade separation structure, and said inner periphery guide section constituting member is composed of a pair of divided blocks dived in a longitudinal direction of the track rail.

6. A motion guide device according to claim 5, wherein either one of said paired divided blocks is formed with a divided block positioning recess and the other one thereof is formed with a divided block positioning protrusion to be engaged with the divided block positioning recess.

7. A motion guide device according to claim 5, wherein said support members include a first support member disposed above the upper loaded rolling member rolling passage, a second support member disposed between the upper loaded rolling member rolling passage and the lower rolling member rolling passage and a third support member disposed below the lower loaded rolling member rolling passage.

8. A motion guide device which comprises a track member provided with a rolling member rolling portion and a movable member disposed to be movable along the track member through a number of rolling members and in which said movable member is provided with a loaded rolling member rolling portion corresponding to the rolling member rolling portion of the track member, a rolling member escape passage disposed in parallel to the loaded rolling member rolling portion with a predetermined distance and a pair of direction changing passages connecting the loaded rolling member rolling portion and the rolling member escape passage to thereby circulate the rolling members, wherein support members extending along both side edges of the loaded rolling member rolling portion and a pair of inner periphery portions of the direction changing passages, being made of resin, are formed to be independent from a body of the movable member and also independent from each other and are assembled to the body of the movable member, and said rolling member escape passage is constituted by a through hole perforated to the body of the movable member, and wherein a pair of side lids constituting outer periphery guide sections of the direction changing passages are mounted to both longitudinal end portions of the movable member body, both the end portions of said support member are inserted into said side lids, and either one of the inner periphery guide section constituting member and the support member with respect to the inner periphery guide section constituting member and the other one thereof is formed with a support member positioning protrusion to be engaged with said support member positioning recess.

* * * * *